(12) United States Patent
Ghiladi et al.

(10) Patent No.: US 12,543,739 B2
(45) Date of Patent: Feb. 10, 2026

(54) UNIVERSAL PHOTODYNAMIC SPRAY COATINGS FOR INFECTION CONTROL

(71) Applicant: North Carolina State University, Raleigh, NC (US)

(72) Inventors: Reza Arman Ghiladi, Raleigh, NC (US); Richard John Spontak, Raleigh, NC (US); Frank Scholle, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 806 days.

(21) Appl. No.: 17/658,663

(22) Filed: Apr. 11, 2022

(65) Prior Publication Data

US 2022/0322668 A1   Oct. 13, 2022

Related U.S. Application Data

(60) Provisional application No. 63/172,767, filed on Apr. 9, 2021.

(51) Int. Cl.
*A01N 43/90* (2006.01)
*A01N 25/10* (2006.01)
*A01N 43/84* (2006.01)
*A01P 1/00* (2006.01)

(52) U.S. Cl.
CPC ............. *A01N 43/90* (2013.01); *A01N 25/10* (2013.01); *A01N 43/84* (2013.01); *A01P 1/00* (2021.08)

(58) Field of Classification Search
CPC ............ A01N 43/90; A01N 25/10; A01P 1/00
See application file for complete search history.

(56) References Cited

U.S. PATENT DOCUMENTS

2004/0151691 A1* 8/2004 Oxman ................ A61K 31/765
424/78.38

FOREIGN PATENT DOCUMENTS

| CN | 105669923 A | * | 6/2016 | ................ C08F 2/44 |
| WO | WO-0078854 A1 | * | 12/2000 | ............ A45C 11/005 |
| WO | WO-2013190469 A2 | * | 12/2013 | ............. A61K 8/046 |
| WO | WO-2017108767 A1 | * | 6/2017 | ............... A61K 8/06 |

OTHER PUBLICATIONS

Bharadwaja S. T., "Photodynamic Coatings on Polymer Microfibers for Pathogen Inactivation: Effects of Application Method and Composition" ACS Appl. Mater. Interfaces 2021, 13, 155-163.

Ghareeb, C Ronald "Toward Universal Photodynamic Coatings for Infection Control" Frontiers in Medicine, Jul. 2021, 3:657837 (12pp).

* cited by examiner

*Primary Examiner* — Alma Pipic
(74) *Attorney, Agent, or Firm* — Thomas| Horstemeyer, LLP

(57) ABSTRACT

In one aspect, the disclosure relates to antimicrobial compositions containing a photosensitizer, a crosslinkable polymer, and a solvent; methods of applying the same to surfaces; methods of using the same to impart antimicrobial properties to surfaces; and surfaces treated using the same. In one aspect, the compositions are effective against a wide range of viruses and bacteria, stable in ambient room lighting, and effective for a period of up to four weeks or longer after a single application. This abstract is intended as a scanning tool for purposes of searching in the particular art and is not intended to be limiting of the present disclosure.

13 Claims, 11 Drawing Sheets

UNIVERSAL PHOTODYNAMIC SPRAY COATINGS FOR INFECTION CONTROL

CROSS REFERENCE TO RELATED APPLICATIONS

This application claims the benefit of U.S. Provisional Application No. 63/172,767 filed on Apr. 9, 2021, which is incorporated herein by reference in its entirety.

STATEMENT REGARDING FEDERALLY SPONSORED RESEARCH OR DEVELOPMENT

This invention was made with government support under grant numbers CNS1844766 and IIP2014753 awarded by the National Science Foundation. The government has certain rights in the invention.

BACKGROUND

As one of the most catastrophic health crises in modern history, the global COVID-19 pandemic caused by the SARS-CoV-2 virus has pummeled strong national economies, imposed unprecedented social restrictions and, above all else, claimed over 6 million lives worldwide (with over 900,000 now dead in the U.S. alone). The virus is primarily transmitted via aerosolized droplets that disperse into the air during speaking, coughing, or sneezing, thereby necessitating the use of facemasks and other protective personal equipment (PPE). Recent studies have demonstrated, however, that the virus remains stable on several surfaces for long periods of time (up to 2-3 days on stainless steel and unspecified plastic), or in some cases even longer, including 7 days on surgical masks. These results indicate that SARS-CoV-2 may also spread by direct contact with contaminated surfaces, including PPE, which is particularly worrisome considering how readily the pathogen spreads within hospitals and related healthcare settings. If the COVID-19 pandemic represents an acute healthcare challenge due to uncontrollable pathogen spread, then the chronic problem relates to nosocomial/hospital acquired infections (HAIs): according to the CDC, 1 out of every 20 hospital patients is affected by nosocomial infections, resulting in 100,000 deaths annually in the U.S. alone. The reasons behind these numbers are well established: improperly disinfected surfaces retain pathogens that infect new hosts, properly disinfected surfaces are quickly and easily re-contaminated by either healthcare personnel or the patients themselves, and pathogens are able to reside on non-routinely cleaned surfaces (e.g., hospital curtains and linens) and remain infectious for long periods of time, estimated to be on the order of weeks in some cases (nosocomial pathogens, including $A.$ $baumannii$ and $S.$ $aureus$, have been reported to survive from weeks to months on inanimate surfaces). Medical textiles, in particular, highlight the need for inherently antimicrobial materials to prevent pathogen transmission, either directly or indirectly, between the hospital environment, patients, and healthcare workers.

Collectively, HAIs and the COVID-19 pandemic are driving a feverish search for long-life antimicrobial materials for efficient infection control. While a variety of approaches are being explored, one such method to produce self-disinfecting materials and provide an opportunity to inactivate various microbes on surfaces prior to human infection, for prolonged periods of time (but which itself is unlikely to lead to the development of drug-resistance), is antimicrobial photodynamic inactivation (aPDI), a branch of photomedicine that employs light, air, and a photosensitizer to generate radicals (Type I) and/or reactive oxygen species (ROS, primarily biocidal 'singlet' oxygen; Type II) as the microbiocidal agent(s).

Despite advances in research regarding control of fomite-based transmission of infections, there is still a scarcity of antimicrobial treatments and compositions that are potent, effective, and long-lived when applied to infrequently disinfected surfaces such as upholstery, curtains, wall coverings, and the like. Ideally, such treatments and compositions would eliminate substantially all active viruses and/or pathogenic bacteria from surfaces comprising a wide range of materials and would remain effective when exposed to typical ambient lighting conditions in medical and other facilities. These needs and other needs are satisfied by the present disclosure.

SUMMARY

In accordance with the purpose(s) of the present disclosure, as embodied and broadly described herein, the disclosure, in one aspect, relates to antimicrobial compositions containing a photosensitizer, a crosslinkable polymer, and a solvent; methods of applying the same to surfaces; methods of using the same to impart antimicrobial properties to surfaces; and surfaces treated using the same. In one aspect, the compositions are effective against a wide range of viruses and bacteria, stable in ambient room lighting, and effective for a period of up to four weeks or longer after a single application.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 10A. Inactivation of HCoV229-E. FIG. 10B. Inactivation of feline calicivirus (FCV), a small non-enveloped virus and EPA approved surrogate for norovirus. Viruses were titered on Huh-7 cells (HCoV-229E) and CRFK cells (FCV) by TCID$_{50}$ assay. The dashed line represents the limit of detection of the TCID$_{50}$ assay.

Figure 1:
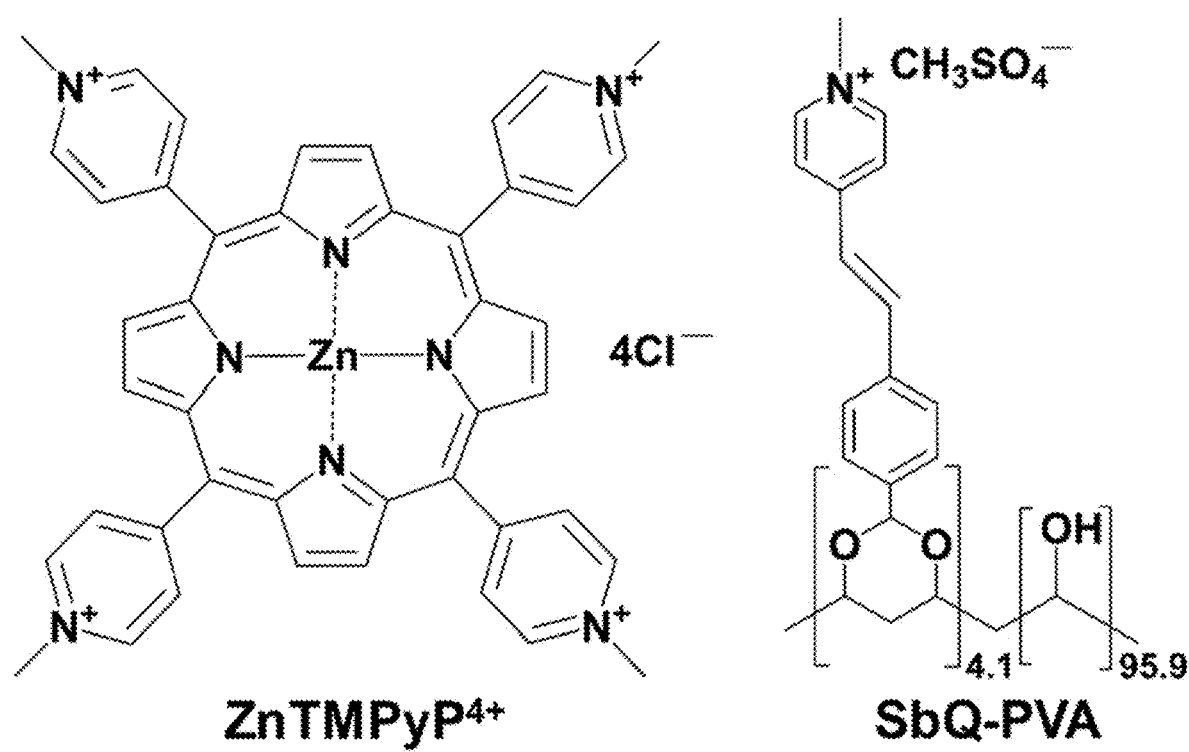
FIG. 1 shows the chemical structures of (left) zinc tetra (4-N-methylpyridyl)porphine (ZnTMPyP$^{4+}$) photosensitizer and (right) a water-soluble, photocrosslinkable N-methyl-4 (4'-formylstyryl)pyridinium methosulfate acetal (herein PVA-SbQ and/or SbQ-PVA) polymer.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

Antimicrobial Compositions

In one aspect, disclosed herein are antimicrobial compositions containing at least the following:
(a) a photosensitizer;
(b) a first crosslinkable polymer; and
(c) a solvent.

In another aspect, the photosensitizer can be ZnTMPyP$^{4+}$, Rose Bengal, methylene blue, tetraphenylporphyrin, curcumin, chlorophyllin A, protoporphyrin IX, carbon quantum dots, or any combination thereof.

In an aspect, the first crosslinkable polymer can be a photocrosslinkable polymer such as, for example, poly(vinyl alcohol), N-methyl-4(4'-formylstyryl)pyridinium methosulfate acetal (PVA-SbQ), bisphenol A glycerolate dimethacrylate (Bis-GMA), bisphenol A ethoxylate dimethacrylate (Bis-EMA), urethane-dimethacrylate monomer (UDMA), triethylene glycol dimethacrylate (TEGDMA), or any combination thereof. In one aspect, the SbQ-PVA has from about 0.1 mol % to about 20 mol % pendant SbQ groups, or about 0.1, 0.5, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, or about 20 mol % pendant SbQ groups, or a combination of any of the foregoing values, or a range encompassing any of the foregoing values. In another aspect, the SbQ-PVA has about 4.1 mol % pendant SbQ groups. In any of these aspects, the first crosslinkable polymer can be water soluble. In one aspect the solvent can be water. In some aspects, the antimicrobial composition has from about 0.1% to about 50% w/v of first crosslinkable polymer relative to the solvent, or about 0.1, 0.5, 1, 5, 10, 15, 20, 25, 30, 35, 40, 45, or about 50% w/v of first crosslinkable polymer relative to the solvent, or a combination of any of the foregoing values, or a range encompassing any of the foregoing values. In another aspect, the antimicrobial composition has about 10% w/v of first crosslinkable polymer relative to the solvent, and has from about 0.01 to about 25% w/w of photosensitizer relative to the first crosslinkable polymer, or about 0.01, 0.05, 0.1, 0.5, 1, 2, 3, 4, 5, 6, 7, 8, 9, 10, 11, 12, 13, 14, 15, 16, 17, 18, 19, 20, 21, 22, 23, 24, or about 25% w/w of photosensitizer relative to the first crosslinkable polymer, or a combination of any of the foregoing values, or a range encompassing any of the foregoing values. In an aspect, the antimicrobial composition has about 1% w/w of photosensitizer relative to the first crosslinkable polymer.

Methods for Applying Antimicrobial Compositions to Surfaces

In another aspect, disclosed herein are methods for applying the disclosed compositions to a surface, the methods including at least the steps of:
(a) applying the composition to a first side of the surface; and
(b) crosslinking the polymer.

In one aspect, the composition can be spray coated, dip coated, slot-die coated, roll coated, physically brushed, or applied using an ultrasonic coater on the first side of the surface. In another aspect, the composition can be applied to a second side of the surface. In one aspect, the composition is spray coated, dip coated, slot-die coated, roll coated, physically brushed, or applied using an ultrasonic coater on the second side of the surface, as well. In any of these aspects, spray coating can be accomplished using an airbrush.

In one aspect, crosslinking the polymer can be accomplished by exposing the surface to UV radiation. In another aspect, the UV radiation has a wavelength of about 365 nm. In one aspect, the surface is exposed to UV radiation for from about 1 second to about two hours, or for about 1 second, 5 seconds, 10 seconds, 30 seconds, 1 minute, 2 minutes, 5 minutes, 10 minutes, 15 minutes, 30 minutes, 45 minutes, 1 hour, 1.5 hours, or about 2 hours, or a combination of any of the foregoing values, or a range encompassing any of the foregoing values. In one aspect, the surface is exposed to UV radiation for about one hour.

In some aspects, the method further includes the step of:
(c) applying a sealant composition to the first side of the surface, the second side of the surface, or both;
wherein the sealant composition includes a second crosslinkable polymer and the solvent; and
wherein step (c) is optionally performed a second time.

In one aspect, the first crosslinkable polymer and the second crosslinkable polymer can be the same or different. In another aspect, the second crosslinkable polymer can be selected from poly(vinyl alcohol), N-methyl-4(4'-formylstyryl)pyridinium methosulfate acetal (PVA-SbQ), bisphenol A glycerolate dimethacrylate (Bis-GMA), bisphenol A ethoxylate dimethacrylate (Bis-EMA), urethane-dimethacrylate monomer (UDMA), triethylene glycol dimethacrylate (TEGDMA), or any combination thereof. In one aspect, the SbQ-PVA has from about 0.1 mol % to about 20 mol % pendant SbQ groups, or about 0.1, 0.5, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, or about 20 mol % pendant SbQ groups, or a combination of any of the foregoing values, or a range encompassing any of the foregoing values. In another aspect, the SbQ-PVA has about 4.1 mol % pendant SbQ groups. In any of these aspects, the first crosslinkable polymer can be water soluble. In one aspect the solvent can be water. In some aspects, the antimicrobial composition has from about 0.1% to about 50% w/v of first crosslinkable polymer relative to the solvent, or about 0.1, 0.5, 1, 5, 10, 15, 20, 25, 30, 35, 40, 45, or about 50% w/v or first crosslinkable polymer relative to the solvent, or a combination of any of the foregoing values, or a range encompassing any of the foregoing values.

In one aspect, the sealant composition is spray coated, dip coated, or first spray coated and subsequently dip coated on the surface. In a further aspect, spray coating can be accomplished using an airbrush. In some aspects, no sealant composition is used.

In any of these aspects, the method can further include the step of crosslinking the second crosslinkable polymer. In a further aspect, crosslinking the second crosslinkable polymer can be accomplished by exposing the surface to UV radiation having a wavelength of about 365 nm. In one aspect, UV exposure can be conducted for about 30 minutes.

In another aspect, the crosslinked composition and optional crosslinked sealant composition have a combined thickness of from about 50 nm to about 200 μm, or from about 0.5 μm to about 2 μm, or of about 50, 100, 150, 200, 250, 300, 350, 400, 450, 500, 550, 600, 650, 700, 750, 800, 850, 900, or 950 nm, or about 1, 5, 10, 50, 100, 150, or about 200 μm, or a combination of any of the foregoing values, or a range encompassing any of the foregoing values.

Methods for Making Surfaces Antimicrobial

Also disclosed herein are methods for activating the antimicrobial properties of surfaces, the methods including at least the steps of:
(a) applying the disclosed compositions to the surfaces or performing the disclosed methods for applying the compositions to the surfaces; and
(b) illuminating at least one side of the surfaces;
wherein illuminating at least one side of the surfaces activates the photosensitizer.

In another aspect, the at least one side of the surface can be illuminated using fluorescent room lighting, LED room lighting, incandescent lighting, laser light, halogen lighting, metal halide lighting, high pressure sodium lighting, low pressure sodium lighting, flash lamp lighting, sunlight, or any combination thereof. In another aspect, the at least one side of the surface is illuminated using lighting having a wavelength of from about 365 to about 1000 nm, or from about 400 to about 700 nm, or of about 365, 375, 400, 425, 450, 475, 500, 525, 550, 575, 600, 625, 650, 675, 700, 725, 750, 775, 800, 825, 850, 875, 900, 925, 950, 975, or about 1000 nm, or a combination of any of the foregoing values, or a range encompassing any of the foregoing values. In still another aspect, the at least one side of the surface is illuminated using lighting having a power of from about 1 $\mu$W/cm$^2$ to about 200 mW/cm$^2$, or of about 1, 5, 10, 50, 100, 150, 200, 250, 300, 350, 400, 450, 500, 550, 600, 650, 700, 750, 800, 850, 900, or about 950 $\mu$W/cm$^2$, or about 1, 5, 10, 50, 100, 150, or about 200 mW/cm$^2$, or a combination of any of the foregoing values, or a range encompassing any of the foregoing values. In another aspect, the at least one side of the surface can be illuminated from about 15 seconds to about 2 hours, or from about 15 seconds to about 1 minute, or from about 1 minute to about 120 minutes, or for 15, 30, or 45 seconds, 1, 5, 10, 15, 20, 25, 30, 35, 40, 45, 50, or 55 minutes, or 1, 1.5, or 2 hours, or a combination of any of the foregoing values, or a range encompassing any of the foregoing values.

In one aspect, performing the method inactivates from about 90% to about 99.9999% of at least one bacterium on the surface, or inactivates about 90, 90.5, 91, 91.5, 92, 92.5, 93, 93.5, 94, 94.5, 96, 96.5, 97, 97.5, 98, 98.5, 99, 99.5, 99.9, 99.99, 99.999, or about 99.9999% of the at least one bacterium, or a combination of any of the foregoing values, or a range encompassing any of the foregoing values. In one aspect, the at least one bacterium can be *Staphylococcus aureus, Pseudomonas aeruginosa*, an *Enterococcus* species, *Klebsiella pneumoniae*, an *Enterobacter* species, *Acinetobacter baumannii, Bacillus subtilis, Clostridium difficile*, other Gram-negative and Gram-positive bacteria, or any combination thereof. In another aspect, the method can inactivate from about 90% to about 99.9999% of spores of a bacterial species on the surface, or can inactivate about 90, 90.5, 91, 91.5, 92, 92.5, 93, 93.5, 94, 94.5, 96, 96.5, 97, 97.5, 98, 98.5, 99, 99.5, 99.9, 99.99, 99.999, or about 99.9999% of the spores, or a combination of any of the foregoing values, or a range encompassing any of the foregoing values. In a further aspect, the spores from the bacterial species can be *Bacillus subtilis* or *Clostridium difficile* spores, spores from another bacterial species, or any combination thereof.

In another aspect, performing the method inactivates from about 90% to about 99.9999% of at least one virus on the surface, or inactivates about 90, 90.5, 91, 91.5, 92, 92.5, 93, 93.5, 94, 94.5, 96, 96.5, 97, 97.5, 98, 98.5, 99, 99.5, 99.9, 99.99, 99.999, or about 99.9999% of the at least one virus, or a combination of any of the foregoing values, or a range encompassing any of the foregoing values. In an aspect, the virus can be a small, non-enveloped virus, a large, non-enveloped virus, or an enveloped virus. In one aspect, the at least one virus can be a human coronavirus, feline calicivirus, norovirus, human adenovirus type 5, influenza A, vesicular stomatitis virus, dengue virus, or any combination thereof. In some aspects, the human coronavirus can be SARS-CoV-2, HCoV-229E, or any other coronavirus.

In still another aspect, performing the method inactivates from about 90% to about 99.9999% of at least one fungal microorganism on the surface, or inactivates about 90, 90.5, 91, 91.5, 92, 92.5, 93, 93.5, 94, 94.5, 96, 96.5, 97, 97.5, 98, 98.5, 99, 99.5, 99.9, 99.99, 99.999, or about 99.9999% of the at least one virus, or a combination of any of the foregoing values, or a range encompassing any of the foregoing values. In another aspect, the fungal microorganism can be *Trichophyton interdigitale, Candida albicans, Candida glabrata, Cryptococcus neoformans*, or any combination thereof.

In any of these aspects, the surface retains antimicrobial activity for a period of from at least 1 week to at least 6 months, or for at least 1, 2, 3, or 4 weeks, or 2, 3, 4, 5, or about 6 months, or a combination of any of the foregoing values, or a range encompassing any of the foregoing values.

Antimicrobial Surfaces

Also disclosed herein are surfaces treated by the disclosed methods. In one aspect, the surface can be a textile, such as, for example, a bandage, gauze, or wound dressing. In a further aspect, the surface or textile can be or include polyester, vinyl, wool, polyamide, cotton, linen, polypropylene, polyethylene, nylon, wool, polyacrylonitrile, poly(ethylene terephthalate), poly(methyl methacrylate), polystyrene, poly(ethylene oxide), poly(vinyl chloride), acrylonitrile butadiene styrene, polycarbonate, polycaprolactone, poly(lactic acid), poly(glycolic acid), ethylene vinyl acetate, poly(ether ether ketone), cyclic olefin copolymer, polytetrafluoroethylene, perfluoroether, fluorinated ethylene propylene, as well as other thermoplastics, thermosets, elastomers not explicitly listed here, including copolymers thereof or any blend thereof.

In another aspect, the surface can be a wall covering, a curtain, upholstery, hospital linens, personal protective equipment, entertainment displays, windows, handles and railings, and the like, or any combination thereof, or any surface that comes into direct contact with a person. In one aspect, the surface includes from about 0.01 to about 10 nmol of the photosensitizer per mg of coated material, or includes about 0.01, 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1, 1.5, 2, 2.5, 3, 3.5, 4, 4.5, 5, 5.5, 6, 6.5, 7, 7.5, 8, 8.5, 9, 9.5, or about 10 nmol of the photosensitizer per mg of the coated material, of a combination of any of the foregoing values, or a range encompassing any of the foregoing values.

In one aspect, after treatment using the disclosed methods, the surface can have a first color. In another aspect, the first color can have a CIELab light-dark (L*) coordinate of from about 50 to about 75, or of about 50, 55, 60, 65, 70, or about 75, or a combination of any of the foregoing values, or a range encompassing any of the foregoing values. In another aspect, the first color can have a CIELab red-green (a*) coordinate of from about −5 to about 1, or of about −5, −4.5, −4, −3.5, −3, −2.5, −2, −1.5, −1, −0.5, 0, 0.5, or about 1, or a combination of any of the foregoing values, or a range encompassing any of the foregoing values. In still another aspect, the first color can have a CIELab yellow-blue (b*) coordinate of from about 1 to about 35, or of about 1, 5, 10, 15, 20, 25, 30, or about 35, or a combination of any of the foregoing values, or a range encompassing any of the foregoing values. In still another aspect, the first color can have a K/S value of from about 0.5 to about 3.5, or of about 0.5, 1, 1.5, 2, 2.5, 3, or about 3.5, or a combination of any of the foregoing values, or a range encompassing any of the foregoing values.

In another aspect, a difference of at least about 30% in one or more of the CIELab L*, a*, or b* coordinates or the K/S value of the first color at a second time relative to the CIELab L*, a*, or b* coordinates or the K/S value of the first color at an initial time indicates a decrease in microbicidal activity.

In another aspect, the disclosed surfaces can include a microbicidal indicator. In one aspect, the microbicidal indicator can be printed on the surface, or can be a separate item that is attached to the surface such as, for example, a decal or sticker.

In some aspects, the microbicidal indicator can have a second color. In one aspect, the first color can be the same as the second color, or can be different from the second color.

In another aspect, the second color can have a CIELab light-dark (L*) coordinate of from about 50 to about 75, or of about 50, 55, 60, 65, 70, or about 75, or a combination of any of the foregoing values, or a range encompassing any of the foregoing values. In another aspect, the second color can have a CIELab red-green (a*) coordinate of from about −5 to about 1, or of about −5, −4.5, −4, −3.5, −3, −2.5, −2, −1.5, −1, −0.5, 0, 0.5, or about 1, or a combination of any of the foregoing values, or a range encompassing any of the foregoing values. In still another aspect, the second color can have a CIELab yellow-blue (b*) coordinate of from about 1 to about 35, or of about 1, 5, 10, 15, 20, 25, 30, or about 35, or a combination of any of the foregoing values, or a range encompassing any of the foregoing values. In still another aspect, the second color can have a K/S value of from about 0.5 to about 3.5, or of about 0.5, 1, 1.5, 2, 2.5, 3, or about 3.5, or a combination of any of the foregoing values, or a range encompassing any of the foregoing values.

In another aspect, a difference of at least about 30% in one or more of the CIELab L*, a*, or b* coordinates or the K/S value of the second color at a second time relative to the CIELab L*, a*, or b* coordinates or the K/S value of the second color at an initial time indicates a decrease in microbicidal activity.

In any of these aspects, following a change of at least about 30% or more in the CIELab L*, a*, or b* coordinates or the K/S value of the surface or the microbicidal indicator, the disclosed methods can be performed a second time to reintroduce microbicidal activity to the surface at an acceptable level.

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

Definitions

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of.

As used in the specification and the appended claims, the singular forms "a," "an" and "the" include plural referents unless the context clearly dictates otherwise. Thus, for example, reference to "a photosensitizer," "a crosslinkable polymer," or "a solvent," include, but are not limited to, mixtures or combinations of two or more such photosensitizers, crosslinkable polymers, or solvents, and the like.

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the term "effective amount" refers to an amount that is sufficient to achieve the desired modification of a physical property of the composition or material. For example, an "effective amount" of a photosensitizer refers to an amount that is sufficient to achieve the desired improvement in the property modulated by the formulation component, e.g. achieving the desired level of antimicrobial activity. The specific level in terms of wt % in a composition required as an effective amount will depend upon a variety of factors including the type of surface to which the disclosed compositions will be applied, frequency of cleaning of the surface, amount and type of thermally microbial exposure, and ambient lighting to which the surface is exposed.

As used herein, the terms "optional" or "optionally" means that the subsequently described event or circumstance can or cannot occur, and that the description includes instances where said event or circumstance occurs and instances where it does not.

As used herein, "ambient lighting" and "ambient room light" refer to general illumination in a room such as, for example, natural light entering through windows as well as artificial lighting from LED bulbs, fluorescent tubes, compact fluorescent bulbs, and the like.

"Antimicrobial" refers to a property of a compound, substance, surface, or the like, that kills or stops the growth of microorganisms. When an antimicrobial agent "inactivates" a bacterium, as used herein, the bacterium dies, becomes unable to reproduce, or becomes incapable of initiating an infection in a subject. When an antimicrobial agent "inactivates" a virus, the virus is rendered incapable of infecting a subject. In one aspect, the compositions disclosed herein impart antimicrobial properties to surfaces. In some aspects, the terms "microbicidal" and "antimicrobial" are used herein interchangeably.

A "decrease" or "reduction" in antimicrobial or microbicidal activity can be measured by recording microbicidal activity at an initial time and again at a second time and comparing the results. If microbicidal or antimicrobial activity is lower at the second time relative to the first, then a decrease or reduction in antimicrobial activity has occurred. In one example, a decrease or reduction occurs if at the initial time, about 99.9999% of at least one pathogen is inactivated or killed upon contact with a treated surface, and at the second time, only 90%, or only 75%, or the like, of the at least one pathogen is killed or inactivated when applied to the surface. In another aspect, a decrease or reduction can occur for reasons including, but not limited to, removal of photosensitizer and/or crosslinkable polymer by washing or abrasion, deactivation of the photosensitizer, or another process. In one aspect, when antimicrobial activity has decreased, the surface can be treated again to restore levels of antimicrobial activity.

As used herein, a "photosensitizer" is chemical species capable of generating radicals (Type I) and/or reactive oxygen species (ROS, primarily biocidal 'singlet' oxygen; Type II) when it absorbs light. In a further aspect, the radicals and/or reactive oxygen species kill, stop reproduction of, or otherwise inactivate microbial species such as, for example, bacteria and/or viruses. In one aspect, disclosed herein are antimicrobial compositions including photosensitizers useful for making surfaces antimicrobial.

"K/S" as used herein depends on light absorption of a dyed textile at its maximum absorption wavelength. A higher K/S value indicates a darker, more saturated color following a dyeing process or, in some aspects, following application of the disclosed compositions containing a photosensitizer.

Unless otherwise specified, temperatures referred to herein are based on atmospheric pressure (i.e. one atmosphere).

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

ASPECTS

The present disclosure can be described in accordance with the following numbered aspects, which should not be confused with the claims.

Aspect 1. An antimicrobial composition comprising:
(a) a photosensitizer;
(b) a first crosslinkable polymer; and
(c) a solvent.

Aspect 2. The antimicrobial composition of aspect 1, wherein the photosensitizer comprises $ZnTMPyP^{4+}$, Rose Bengal, methylene blue, tetraphenylporphyrin, curcumin, chlorophyllin A, protoporphyrin IX, carbon quantum dots, or any combination thereof.

Aspect 3. The antimicrobial composition of aspect 1 or 2, wherein the first crosslinkable polymer comprises a photocrosslinkable polymer.

Aspect 4. The antimicrobial composition of any one of aspects 1-3, wherein the photocrosslinkable polymer comprises poly(vinyl alcohol), N-methyl-4(4'-formylstyryl)pyridinium methosulfate acetal (PVA-SbQ), bisphenol A glycerolate dimethacrylate (Bis-GMA), bisphenol A ethoxylate dimethacrylate (Bis-EMA), urethane-dimethacrylate monomer (UDMA), triethylene glycol dimethacrylate (TEGDMA), or any combination thereof.

Aspect 5. The antimicrobial composition of aspect 4, wherein the PVA-SbQ comprises from about 0.1 mol % to about 20 mol % pendant SbQ groups.

Aspect 6. The antimicrobial composition of aspect 4, wherein the PVA-SbQ comprises about 4.1 mol % pendant SbQ groups.

Aspect 7. The antimicrobial composition of any one of aspects 1-6, wherein the first crosslinkable polymer is water soluble.

Aspect 8. The antimicrobial composition of any one of aspects 1-7, wherein the solvent comprises water.

Aspect 9. The antimicrobial composition of any one of aspects 1-8, wherein the antimicrobial composition comprises from about 0.1 to about 50% w/v of the first crosslinkable polymer relative to the solvent.

Aspect 10. The antimicrobial composition of any one of aspects 1-8, wherein the antimicrobial composition comprises about 10% w/v of the first crosslinkable polymer relative to the solvent.

Aspect 11. The antimicrobial composition of any one of aspects 1-10, wherein the antimicrobial composition comprises from about 0.01 to about 25% w/w of photosensitizer relative to the first crosslinkable polymer.

Aspect 12. The antimicrobial composition of any one of aspects 1-10, wherein the antimicrobial composition comprises about 1% w/w of photosensitizer relative to the first crosslinkable polymer.

Aspect 13. A method for applying the composition of any one of aspects 1-12 to a surface, the method comprising:
(a) applying the composition to a first side of the surface; and
(b) crosslinking the polymer.

Aspect 14. The method of aspect 13, wherein the composition is spray coated, dip coated, slot die coated, roll coated, physically brushed, or applied using an ultrasonic coater on the first side of the surface.

Aspect 15. The method of aspect 13 or 14, further comprising applying the composition to a second side of the surface.

Aspect 16. The method of aspect 15, wherein the composition is spray coated, dip coated, slot die coated, roll coated, physically brushed, or applied using an ultrasonic coater on the second side of the surface.

Aspect 17. The method of aspect 14 or 16, wherein spray coating is accomplished using an airbrush.

Aspect 18. The method of any one of aspects 13-17, wherein crosslinking the polymer is accomplished by exposing the surface to UV radiation.

Aspect 19. The method of aspect 18, wherein the UV radiation has wavelength 365 nm.

Aspect 20. The method of aspect 18 or 19, wherein the surface is exposed to UV radiation for from about 1 second to about 2 hours.

Aspect 21. The method of aspect 18 or 19, wherein the surface is exposed to UV radiation for about one hour.

Aspect 22. The method of any one of aspects 13-21, further comprising:
(c) applying a sealant composition to the first side of the surface, the second side of the surface, or both;
wherein the sealant composition comprises a second crosslinkable polymer and the solvent; and
wherein step (c) is optionally performed a second time.

Aspect 23. The method of aspect 22, wherein the first crosslinkable polymer and the second crosslinkable polymer are the same.

Aspect 24. The method of aspect 22, wherein the first crosslinkable polymer and the second crosslinkable polymer are different.

Aspect 25. The method of any one of aspects 22-24, wherein the sealant composition is spray coated, dip coated, or first spray coated and subsequently dip coated on the surface.

Aspect 26. The method of aspect 25, wherein spray coating is accomplished using an airbrush.

Aspect 27. The method of any one of aspects 22-26, further comprising crosslinking the second crosslinkable polymer.

Aspect 28. The method of aspect 27, wherein crosslinking the second crosslinkable polymer from the sealant composition is accomplished by exposing the surface to UV radiation.

Aspect 29. The method of aspect 28, wherein the UV radiation has wavelength 365 nm.

Aspect 30. The method of aspect 28 or 29, wherein the surface is exposed to UV radiation for about 30 minutes.

Aspect 31. The method of any one of aspects 13-30, wherein the crosslinked composition and optional crosslinked sealant composition have a combined thickness of from about 50 nm to about 200 μm.

Aspect 32. A method for activating antimicrobial properties of a surface, the method comprising:
(a) applying the composition of any one of aspects 1-12 to the surface or of performing the method of any one of aspects 13-31 on the surface; and
(b) illuminating at least one side of the surface;
wherein illuminating the at least one side of the surface activates the photosensitizer.

Aspect 33. The method of aspect 32, wherein the at least one side of the surface is illuminated using fluorescent room lighting, LED room lighting, incandescent lighting, laser light, halogen lighting, metal halide lighting, high pressure sodium lighting, low pressure sodium lighting, flash lamp lighting, sunlight, or any combination thereof.

Aspect 34. The method of aspect 32 or 33, wherein the at least one side of the surface is illuminated using lighting having a wavelength of from about 365 to about 1000 nm.

Aspect 35. The method of any one of aspects 32-34, wherein the at least one side of the surface is illuminated from about 15 seconds to about 2 hours.

Aspect 36. The method of any one of aspects 32-35, wherein the at least one side of the surface is illuminated using lighting having a power of from about 1 $\mu W/cm^2$ to about 200 $mW/cm^2$.

Aspect 37. The method of any one of aspects 32-36, wherein performing the method inactivates from about 90% to about 99.9999% of at least one bacterium on the surface.

Aspect 38. The method of aspect 37, wherein the at least one bacterium comprises *Staphylococcus aureus*, *Pseudomonas aeruginosa*, an *Enterococcus* species, *Klebsiella pneumoniae*, an *Enterobacter* species, *Acinetobacter baumannii*, *Bacillus subtilis*, *Clostridium difficile*, or any combination thereof.

Aspect 39. The method of aspect 37, wherein the method inactivates from about 90% to about 99.9999% of spores of a bacterial species on the surface.

Aspect 40. The method of aspect 38, wherein the bacterial species comprises *Bacillus subtilis* or *Clostridium difficile*.

Aspect 41. The method of any one of aspects 32-36, wherein performing the method inactivates from about 90% to about 99.9999% of at least one virus on the surface.

Aspect 42. The method of aspect 41, wherein the at least one virus comprises a human coronavirus, feline calicivirus, norovirus, human adenovirus type 5, influenza A, vesicular stomatitis virus, dengue virus, or any combination thereof.

Aspect 43. The method of aspect 42, wherein the human coronavirus comprises SARS-CoV-2 or HCoV-229E.

Aspect 44. The method of any one of aspects 32-36, wherein performing the method inactivates from about 90% to about 99.9999% of at least one fungal microorganism on the surface.

Aspect 45. The method of aspect 44, wherein the at least one fungal microorganism comprises *Trichophyton interdigitale*, *Candida albicans*, *Candida glabrata*, *Cryptococcus neoformans*, or any combination thereof.

Aspect 46. The method of any one of aspects 32-45, wherein the surface retains antimicrobial activity for a period of from at least 1 week to at least 6 months.

Aspect 47. A surface treated by the method of any one of aspects 23-46.

Aspect 48. The surface of aspect 47, wherein the surface comprises a textile.

Aspect 49. The surface of aspect 47 or 48, wherein the surface or textile comprises polyester, vinyl, wool, polyamide, cotton, linen, polypropylene, polyethylene, nylon, wool, polyacrylonitrile, poly(ethylene terephthalate), poly(methyl methacrylate), polystyrene, poly(ethylene oxide), poly(vinyl chloride), acrylonitrile butadiene styrene, polycarbonate, polycaprolactone, poly(lactic acid), poly(glycolic acid), ethylene vinyl acetate, poly(ether ether ketone), cyclic olefin copolymer, polytetrafluoroethylene, perfluoroether, fluorinated ethylene propylene, copolymers thereof, or any blend thereof.

Aspect 50. The surface of any one of aspects 47-49 wherein the surface comprises a wall covering, a curtain, upholstery, hospital linens, personal protective equipment, entertainment displays, windows, handles, railings, or any combination thereof.

Aspect 51. The surface of any one of aspects 47-50, wherein the surface comprises from about 0.01 to about 10 nmol of the photosensitizer per mg of the surface.

Aspect 52. The surface of any one of aspects 47-51, wherein the surface comprises a first color after treatment using the method of any one of aspects 23-46.

Aspect 53. The surface of aspect 52, wherein the first color comprises a CIELab light-dark (L*) coordinate of from about 50 to about 75.

Aspect 54. The surface of aspect 52 or 53, wherein the first color comprises a CIELab red-green (a*) coordinate of from about −5 to about 1.

Aspect 55. The surface of any one of aspects 52-54, wherein the first color comprises a CIELab yellow-blue (b*) coordinate of from about 1 to about 35.

Aspect 56. The surface of any one of aspects 52-55, wherein the first color comprises a K/S value of from about 0.5 to about 3.5

Aspect 57. The surface of any one of aspects 52-56, wherein a difference of at least about 30% in one or more of the CIELab L*, a*, or b* coordinates or the K/S value of the first color at a second time relative to the CIELab L*, a*, or *b coordinates or K/S value of the first color at an initial time indicates a decrease in microbicidal activity.

Aspect 58. The surface of any one of aspects 47-57, further comprising a microbicidal indicator.

Aspect 59. The surface of aspect 58, wherein the microbicidal indicator comprises a second color.

Aspect 60. The surface of aspect 59 wherein the second color comprises a CIELab light-dark (L*) coordinate of from about 50 to about 75.

Aspect 61. The surface of aspect 59 or 60, wherein the second color comprises a CIELab red-green (a*) coordinate of from about −5 to about 1.

Aspect 62. The surface of any one of aspects 59-61, wherein the second color comprises a CIELab yellow-blue (b*) coordinate of from about 1 to about 35.

Aspect 63. The surface of any one of aspects 59-62, wherein the second color comprises a K/S value of from about 0.5 to about 3.5.

Aspect 64. The surface of any one of aspects 59-63, wherein a difference of at least about 30% in one or more of the CIELab L*, a*, or b* coordinates or the K/S value of the second color at a second time relative to the CIELab L*, a*, or *b coordinates or K/S value of the second color at an initial time indicates a decrease in microbicidal activity.

Aspect 65. The surface of any one of aspects 58-64, wherein the microbicidal indicator is printed on the surface.

Aspect 66. The surface of any one of aspects 58-64, wherein the microbicidal indicator is attached to the surface.

Aspect 67. The surface of any one of aspects 58-66 wherein the first color is the same as the second color.

Aspect 68. The surface of any one of aspects 57-66, wherein the first color is different from the second color.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the disclosure and are not intended to limit the scope of what the inventors regard as their disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Example 1: Materials and Methods

Materials

The photosensitizer zinc tetra(4-N-methylpyridyl)porphine (ZnTMPyP$^{4+}$) tetrachloride was purchased from Frontier Scientific, while methylene blue (MB) and Rose Bengal (RB) were obtained from Acros Organics. The photocrosslinkable SbQ-PVA polymer with 4.1 mol % functional SbQ groups was supplied by Polysciences, Inc. The following materials were donated by VESCOM America Inc.: Capri (polyester curtain fabric), Deans (polyester upholstery), Husk (proprietary wallcovering), PRU-86364 (proprietary wallcovering), and Wolin (75% wool/20% polyester/5% polyamide upholstery). Buffer salts for the preparation of phosphate-buffered saline (PBS) solution and ultrapure nitric acid for ICP-OES analysis were purchased from Fisher Scientific. Tryptic soy broth was purchased from Teknova. All media and buffer solutions were prepared in ultrapure water provided by an Easypure II system (Barnstead).

Coating Protocol

The coating protocol was performed as previously described with minor modifications. The SbQ-PVA was dissolved in deionized (DI) water at a fixed concentration of 10% w/v SbQ-PVA/water and stirred until fully dissolved according to the unaided eye. Subsequently, photosensitizers (ZnTMPyP$^{4+}$, methylene blue, or Rose Bengal) were dissolved into the aqueous SbQ-PVA solution to achieve a constant PS loading of 1% w/w PS/SbQ-PVA, which was allowed to stir for an additional 15 min prior to coating. The VESCOM® materials (available from Vescom America Inc., Fairlawn, OH) were cut into squares measuring 8 cm×8 cm, with one side of each spray-coated until saturated (between 1-4 mL of solution) using a Master Airbrush Model G22 with a 0.3 mm fluid tip. The samples were then cured in the presence of a MelodySusie UV light (36 W, 365 nm) for 60 min, and the coating process was repeated on the opposite coupon side. A secondary "seal" coat consisting of ~0.05 mL of the parent SbQ-PVA/PS solution (without PS) was then applied on each side, followed by UV-curing for an additional 30 min. Following UV-curing, the coated samples were cut with a hole punch into circles measuring either ~0.5 or 1 cm in diameter for antiviral and antibacterial assays, respectively. The sample discs were then dip-coated in a 10% w/v SbQ-PVA/water solution (without PS) to apply a capping layer, and were further UV-cured until dry. For reference, PS-free control samples were prepared solely from dip-coated VESCOM® discs (cut from materials available from Vescom America Inc., Fairlawn, OH). After the final UV cure, all the discs were washed in DI water overnight and thoroughly dried prior to characterization and conducting the aPDI assays.

Example 2: Characterization

Colorimetric Analysis

Colorimetric analysis was performed at the NC State University Color Science and Imaging Laboratory. To prevent the light from shining through the fabrics, each sample was folded into layers before performing the colorimetric analysis on a Datacolor 650 spectrophotometer equipped with a D65 light source and an aperture of 9 mm at a viewing angle of 10°.

Time-of-Flight Secondary Ion Mass Spectrometry

Time-of-flight secondary ion mass spectrometry (ToF-SIMS) analysis was conducted on coated and uncoated VESCOM® materials (available from Vescom America Inc., Fairlawn, OH) using an IONTOF ToF-SIMS V instrument equipped with a 25 kV bismuth ion ($Bi^+$) sputtering gun. High-resolution ion-specific images were collected wherein the $C_2HO^-$ ion served to indicate the presence of the SbQ-PVA polymer coating.

Scanning Electron Microscopy

The surface morphologies of the coated VESCOM® samples (available from Vescom America Inc., Fairlawn, OH) were examined by scanning electron microscopy (SEM) performed on either a variable-pressure Hitachi 53200N microscope equipped with an Oxford energy-dispersive X-ray spectroscopy (EDS) detector (for Wolin, Deans, Capri, PRU, and Husk), or an FEI Verios 460L FESEM microscope (for Wolin at 50× magnification). The sample discs were mounted on aluminum stubs with carbon tape and sputtered with ~35 nm of Au/Pd to reduce charging. Images were acquired at an accelerating voltage of 20 kV and, in the case of specimens imaged on the Hitachi microscope, a column pressure of 30 Pa $N_2$.

Trace Metal Analysis

Trace metal analysis was performed by the NC State University Environmental and Agricultural Testing Service. The total loading of $ZnTMPyP^{4+}$ on each coated VESCOM® sample (available from Vescom America Inc., Fairlawn, OH) was determined by inductively coupled plasma-optical emission spectroscopy (ICP-OES). Following a previously published protocol, circular samples measuring ~1 cm in diameter were weighed and dissolved in 10 mL ultrapure nitric acid, stirred overnight, centrifuged (4121 g), and filtered prior to Zn analysis on a Perkin Elmer 8000 ICP-OES.

Example 3: Antimicrobial Photodynamic Inactivation (aPDI) Studies

Bacterial Inactivation

Antibacterial photodynamic inactivation assays were performed with Gram-positive methicillin-susceptible *Staphylococcus aureus* 29213 (MSSA). Cultures were grown in 5 mL tryptic soy broth (TSB) incubated at 37° C. in an orbital shaker operated at 250 rpm, and its optical density (OD) was monitored at 600 nm with a Genesys 10 UV scanning spectrophotometer. Cultures were grown to an OD of ~0.4, which corresponds to a bacterial concentration of $1-4\times10^8$ colony-forming units per mL (CFU/mL). Afterwards, the culture was centrifuged for 5 min (3374 g) and the supernatant was subsequently discarded. The resultant bacterial pellets were re-suspended in 5 mL PBS prior to the aPDI assay. VESCOM® sample discs (~1 cm diameter, available from Vescom America Inc., Fairlawn, OH) were fitted into the well-bottoms of a 24-well plate (3 PS-containing samples, 1 PS-free control sample), to which 200 µL of the resuspended bacterial suspension was added and uniformly deposited on top of each sample. An identical plate protected from light with aluminum foil was prepared for the purpose of a dark control. Illumination was provided by a LumaCare LC-122 incoherent visible light source equipped with an OSRAM 64653 HLX Xenophot bulb (250 W, 24 V) and employing a LUM V fiber optic probe (400-700 nm band pass filter) with 95±3% average transmittance. The fluence rate of the light source was measured with an Orphir Optronics Ltd. Orion power meter. A target illumination intensity of 65±5 mW/cm² was applied in accordance with our previous studies. After addition of the bacterial suspension to each well, the well-plate was illuminated for 60 min, after which 40 µL was withdrawn from each of the wells and added to a 360 µL PBS aliquot to serve as a 1:10 dilution. This procedure was repeated five times to generate six ten-fold serial dilutions for each well. A 10 µL aliquot from each dilution was pipetted onto six-column-gridded square plates that were previously prepared with antibiotic-free TSB/agar, and then incubated overnight at 37° C. Colony-forming units were counted and the corresponding level of bacterial inactivation was calculated by dividing the CFU/mL count of the illuminated samples by either the corresponding dark or PS-free controls. All studies were performed in triplicate, and statistical significance (p) was assessed using an unpaired student's two-tailed t-test (in which statistical significance is established when $p<0.05$). The minimum detection limit (MDL) for these antibacterial studies was 0.0001% survival.

Viral Inactivation

The human coronavirus HCoV-229E was grown to a titer of $10^9$ $TCID_{50}$/mL on the human hepatocarcinoma cell line (Huh-7) in cell growth media (DMEM, 1% antibiotics, 10% fetal bovine serum, FBS) at 35° C. The spray-coated VESCOM® samples (6 mm diameter, available from Vescom America Inc., Fairlawn, OH) were fitted into the well-bottoms of a 96-well plate, and 25 µL of virus suspension was added to the wells. A set of dark controls wrapped in aluminum foil were left unexposed to light for 60 min. For samples exposed to light, the illumination intensity was 65±5 mW/cm². After illumination for 60 min, 75 µL of infection media (DMEM 1% antibiotics, 1% FBS, 1% HEPES buffer) were added, and the virus was eluted by triturating several times, followed by rapid transfer to new wells. Virus suspensions were immediately diluted serially ten-fold, and 50 µL of four replicates of each dilution were used to infect Huh-7 cells seeded the previous day at a density of $10^4$ cells per well in a $TCID_{50}$ assay protocol. The plates were incubated at 35° C. with 5% $CO_2$. After 96 h, the cytopathic effect was monitored by visual inspection, and resulting $TCID_{50}$/mL values (MDL of 632 $TCID_{50}$/mL) were calculated according to the Spearman-Kaerber method. All studies were performed in triplicate.

Longevity Studies

For each photosensitizer (MB, RB, and $ZnTMPyP^{4+}$), a total of 15 samples (6 mm diameter) of Husk material coated with SbQ-PVA/PS were prepared. Of these 15 samples, three were stored in the dark at RT for later testing as non-photobleached materials (at t=0). The 12 remaining samples were placed in a petri dish on a tabletop and continuously exposed to ambient laboratory room light (fluorescent) weekly for four weeks. During this time, three samples were collected and stored in the dark at ambient temperature until evaluation. At the conclusion of 4 weeks, the photo-aged and non-photobleached (t=0) samples, as well as dark controls and PS-free controls, were evaluated three times: first, as described above; second, taking these one-time evaluated samples, freezing them at −20° C. for 18 days, thawing each sample followed by washing in 200 μL PBS, and then repeating the viral inactivation assay; and third, after washing, repeating the antiviral assay on the twice-evaluated samples. These three-time evaluated samples were compared to freshly prepared materials.

Ambient Light Studies

Figure 10A:
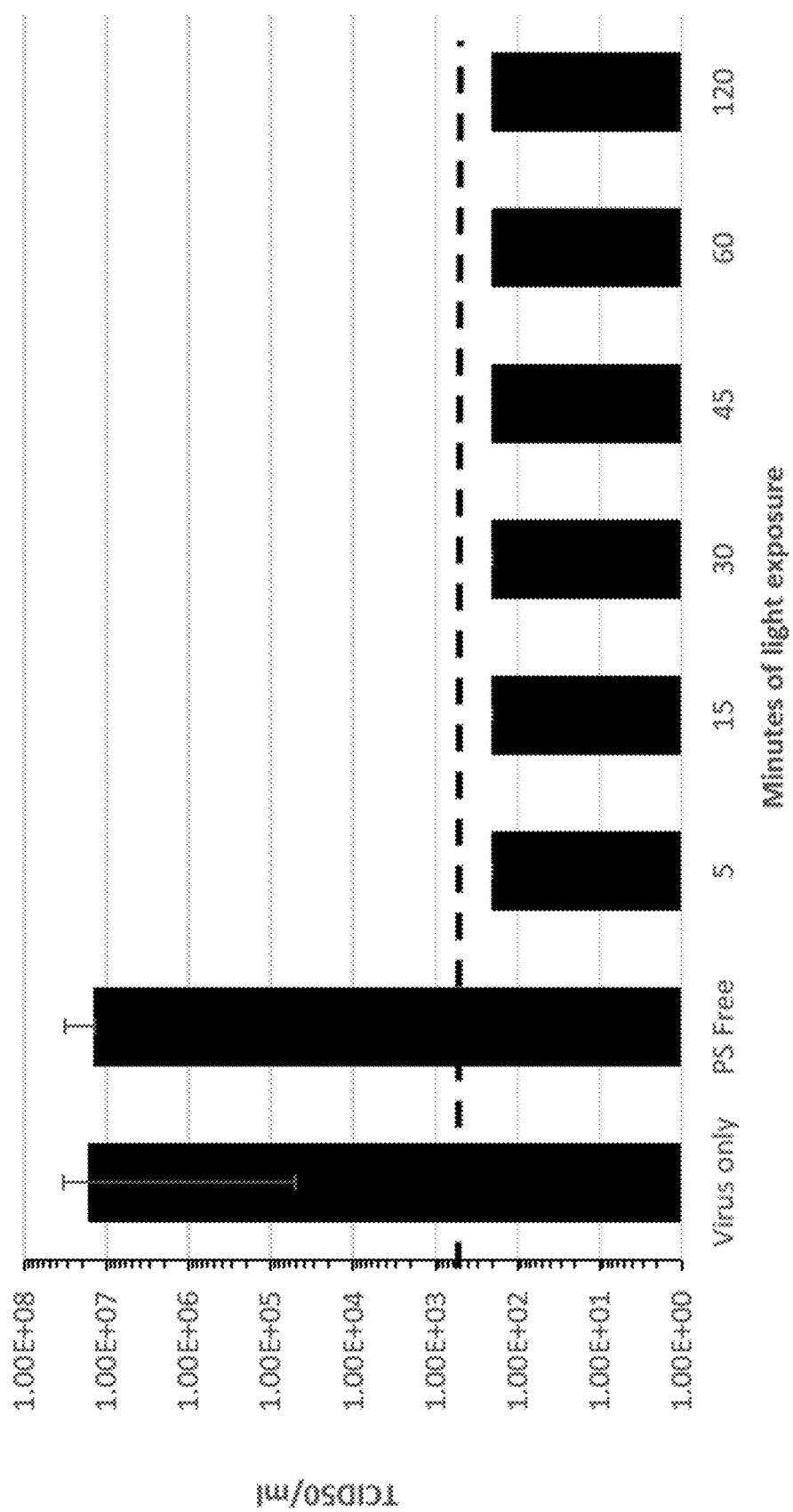
FIGS. 10A-10B show viral inactivation on SbQ-PVA/MB coated VESCOM® materials (available from Vescom America Inc., Fairlawn, OH) after exposure to ambient light.
Figure 10B:
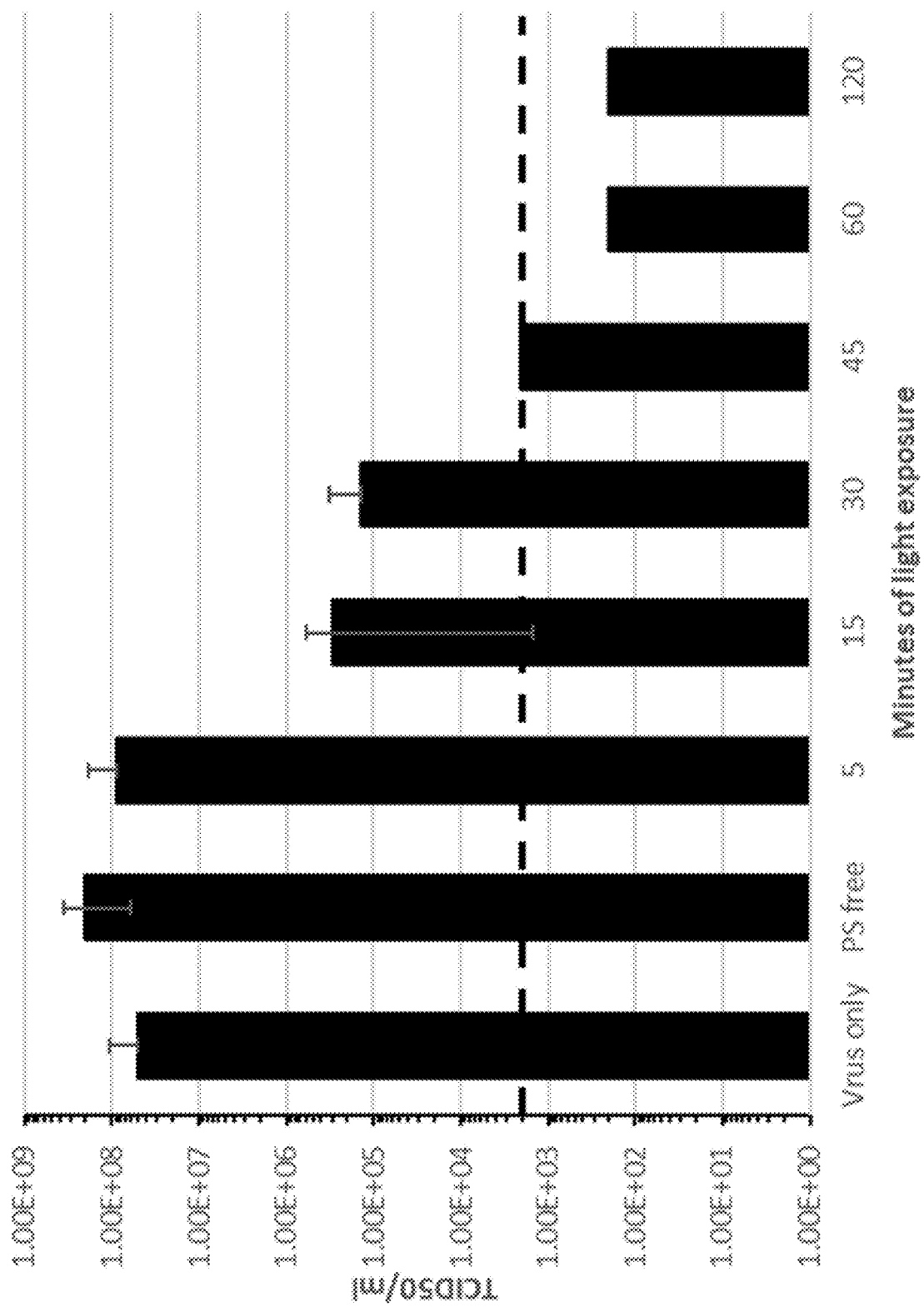

For each experiment 21 samples (6 mm diameter) were prepared from MB-coated Vescom® materials (available from Vescom America Inc., Fairlawn, OH) and 3 samples from non-coated material. The samples were incubated with either HCoV-229E or feline calicivirus (FCV) in a time dependent manner (5, 15, 30, 45, 60 and 120 minutes and incubated in a biosafety cabinet with the light turned on. At the indicated times viruses were removed from the samples and tittered by TCI D50 assay. Results are shown in FIGS. 10A-10B.

Example 4: Characterization

Materials Coating

In our previous study, SbQ-PVA/ZnTMPyP$^{4+}$ was successfully applied by both spray- and dip-coating methods to relatively uniform nylon-PA6 spunbond fibers. To determine if SbQ-PVA/PS coatings could be applied to a broader range of materials commonly utilized in areas such as hospital waiting rooms and patient rooms, a variety of commercially-available materials (available from Vescom America Inc., Fairlawn, OH) having applications from curtains to upholsteries and wallpaper were examined. Here, we primarily employed ZnTMPyP$^{4+}$ for characterization and antimicrobial evaluation for comparative purposes to our previous studies employing this and related tetrapyrrole photosensitizers. Other photosensitizers, e.g., methylene blue and Rose Bengal, were also evaluated for antimicrobial efficacy and will be discussed further below.

Each VESCOM® material (available from Vescom America Inc., Fairlawn, OH) was prepared using the same method in which the bicomponent SbQ-PVA/PS (FIG. 1) mixture was applied to both sides of an 8×8 cm sample via spray coating, followed by UV curing. Two separate "sealant" coats were then applied utilizing SbQ-PVA alone: the first by spray coating to ensure the photosensitizer was fully embedded within the polymer matrix to prevent PS leaching, and the second by dip coating after samples were cut to size to further seal the fibers from possible damage incurred during specimen trimming. After preparation, the materials were washed overnight to remove any unbound PS, although this was found to be unnecessary (i.e., no significant PS leaching was observed spectroscopically).

Figure 2:
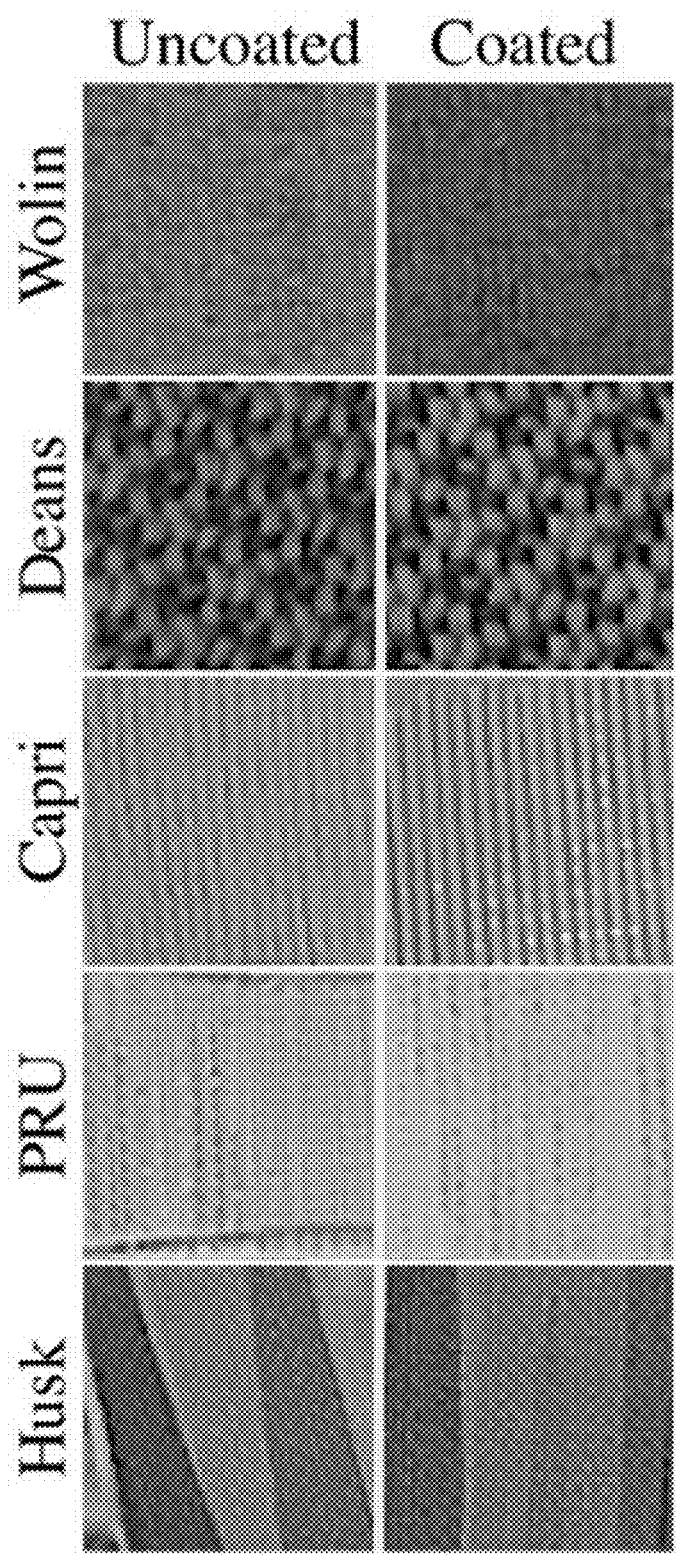
FIG. 2 shows photographic images of VESCOM® materials (available from Vescom America Inc., Fairlawn, OH) without (left) and with (right) the SbQ-PVA/ZnTMPyP$^{4+}$ coating.
Figure 3:
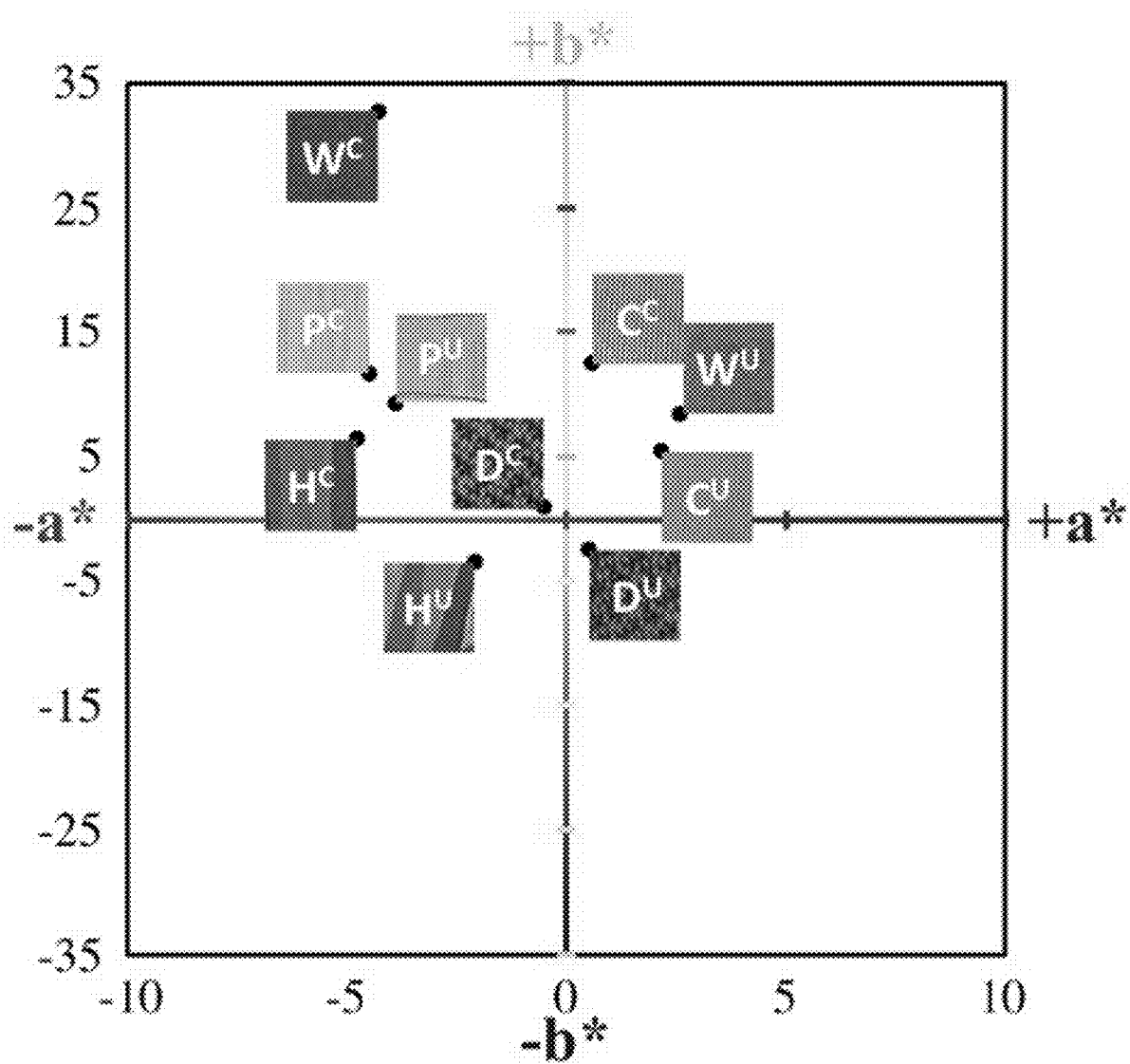
FIG. 3 shows corresponding coordinate positions of the VESCOM® materials (available from Vescom America Inc., Fairlawn, OH) in CIELab color space for a* and b*. The L* values (white/black) were not plotted for simplicity. The superscripts U and C denote uncoated and coated (SbQ-PVA/ZnTMPyP$^{4+}$) materials, respectively. Labels are as follows: C, Capri; D, Deans; H, Husk; P, PRU-86364; W, Wolin.

As can be seen in FIG. 2, the presence of the ZnTMPyP$^{4+}$ photosensitizer can be visually observed in the coated samples from their increased green hue when compared to the uncoated samples. Colorimetric analysis (CIELab values) was performed on both coated and uncoated samples (Table 1) to quantitatively assess the color change upon PS addition. As expected, due to the absorption properties of the ZnTMPyP$^{4+}$ photosensitizer ($\lambda$max=436 nm), there is an overall shift towards green (towards −a*, +b*; FIG. 3) in all samples post-coating, consistent with the presence of the PS. In line with the visual changes depicted in FIG. 2, the Wolin specimen exhibited the greatest changes in CIELab values after coating, followed by the Husk and Capri materials that both showed similar overall green shifts, while the Deans and PRU samples presented the smallest overall shift. While this analysis confirms the overall presence of the photosensitizer qualitatively, it is not indicative of the quantitative PS loading (vide infra), as the initial color and hue of each material likely impacts the CIELab values.

TABLE 1

CIELab Colorimetric Analysis of Uncoated and SbQ-PVA/ZnTMPyP$^{4+}$ Coated VESCOM ® Materials (available from Vescom America Inc., Fairlawn, OH)

| | CIE L* | | CIE a* | | | CIE b* | | | K/S[1] | |
|---|---|---|---|---|---|---|---|---|---|---|
| Specimen | Uncoated | Coated | Uncoated | Coated | Δa* | Uncoated | Coated | Δb* | Uncoated | Coated |
| Wolin | 65.78 | 55.13 | 2.58 | −4.30 | −6.88 | 8.41 | 32.76 | 24.35 | 1.22 | 3.48 |
| Deans | 54.40 | 51.24 | 0.52 | −0.51 | −1.03 | −2.46 | 1.01 | 3.47 | 1.34 | 1.92 |
| Capri | 67.65 | 69.84 | 2.17 | 0.59 | −1.58 | 5.43 | 12.50 | 7.07 | 0.75 | 0.91 |
| PRU | 73.63 | 73.52 | −3.90 | −4.51 | −0.61 | 9.34 | 11.67 | 2.33 | 0.61 | 0.68 |
| Husk | 46.91 | 59.01 | −2.10 | −4.78 | −2.68 | −3.45 | 6.47 | 9.92 | 2.69 | 1.60 |

[1]K represents the absorbance coefficient and S represents the scattering coefficient. A higher K/S value indicates a more saturated color in a coated textile.

Polymer Coating

Figure 4:
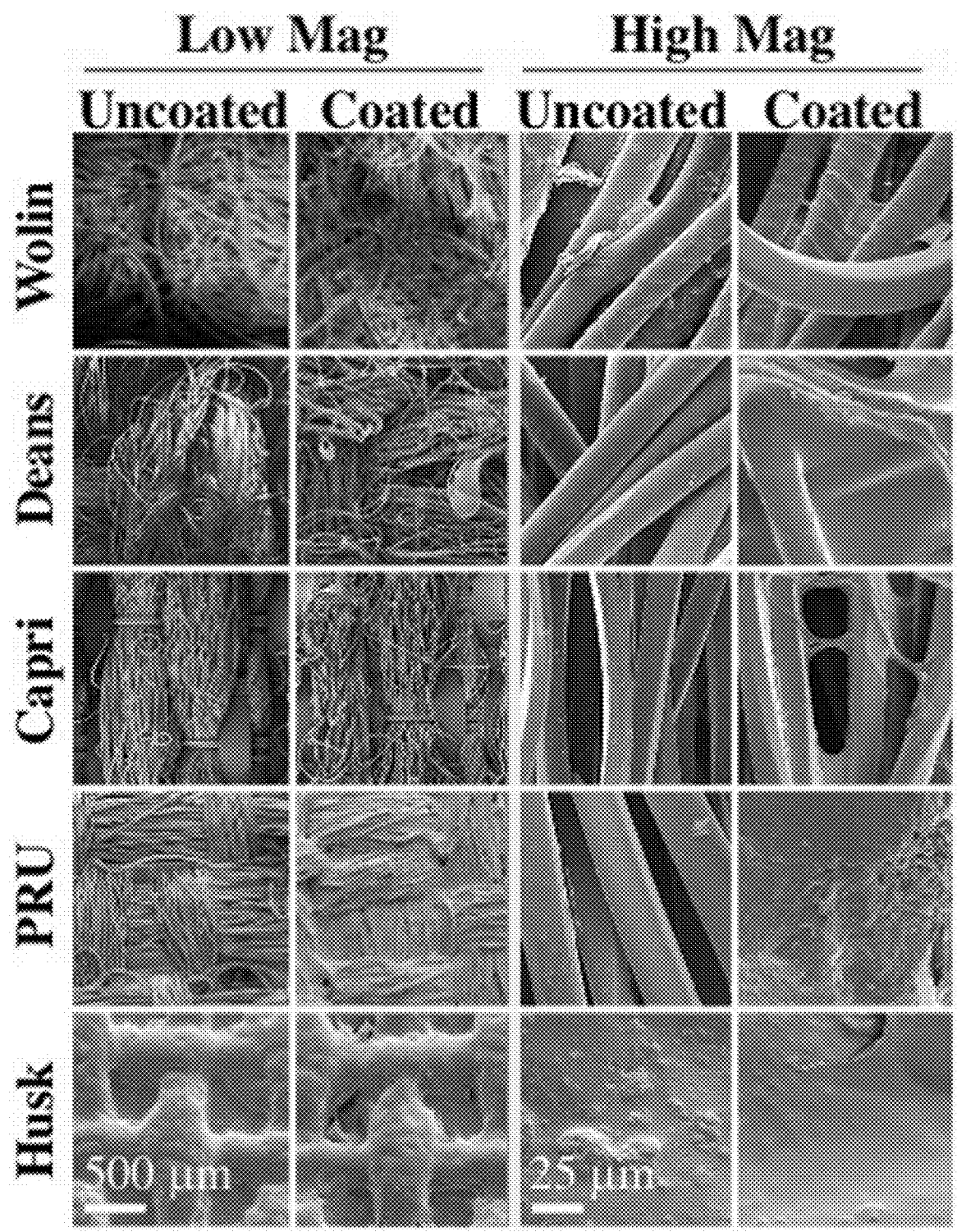
FIG. 4 shows scanning electron microscopy (SEM) images of uncoated and coated (SbQ-PVA/ZnTMPyP$^{4+}$) VESCOM® materials (available from Vescom America Inc., Fairlawn, OH) at low (left) and high (right) magnifications.
Figure 5:
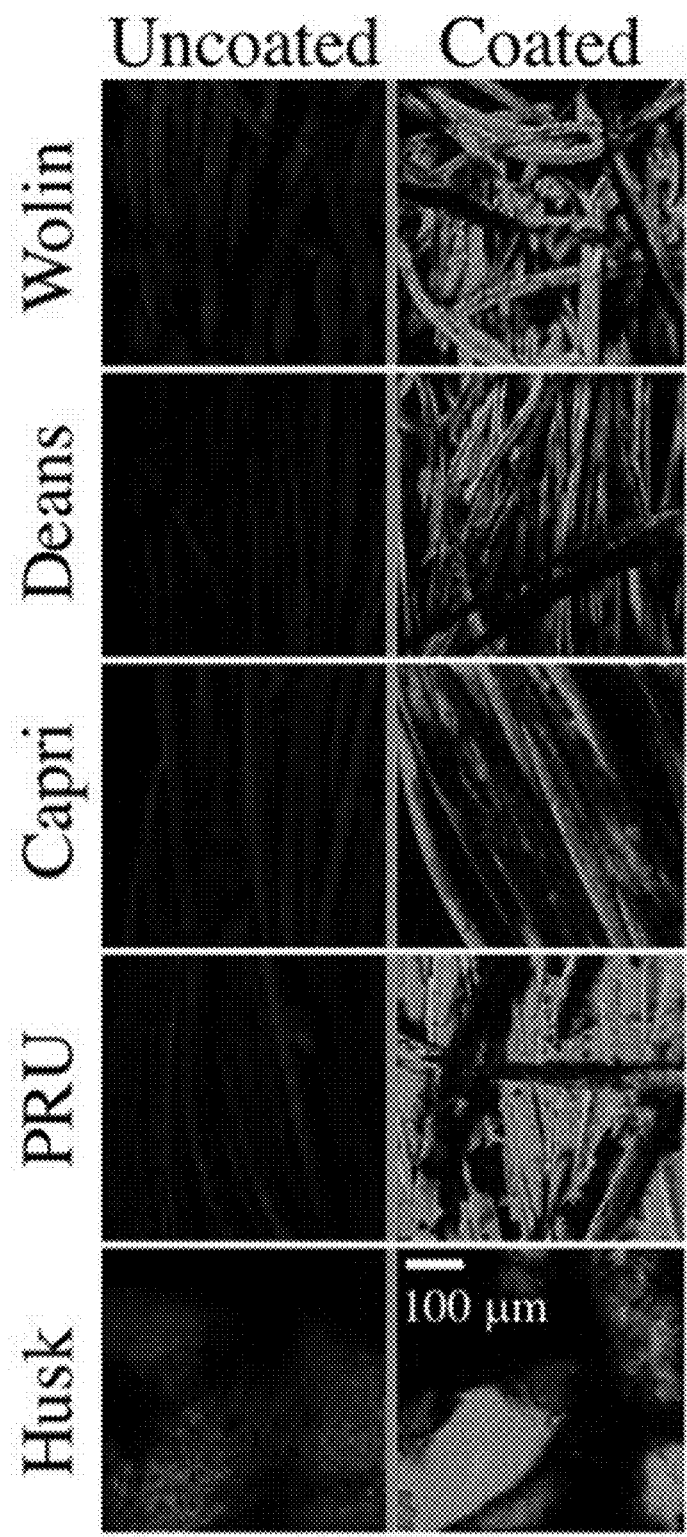
FIG. 5 shows time-of-flight secondary-ion mass spectrometry (ToF-SIMS) images of $C_2H_3O_2^-$ ions representative of the SbQ-PVA coating acquired for the uncoated (left) and coated (right) VESCOM® materials (available from Vescom America Inc., Fairlawn, OH) with SbQ-PVA/ZnTMPyP$^{4+}$.
Figure 9:
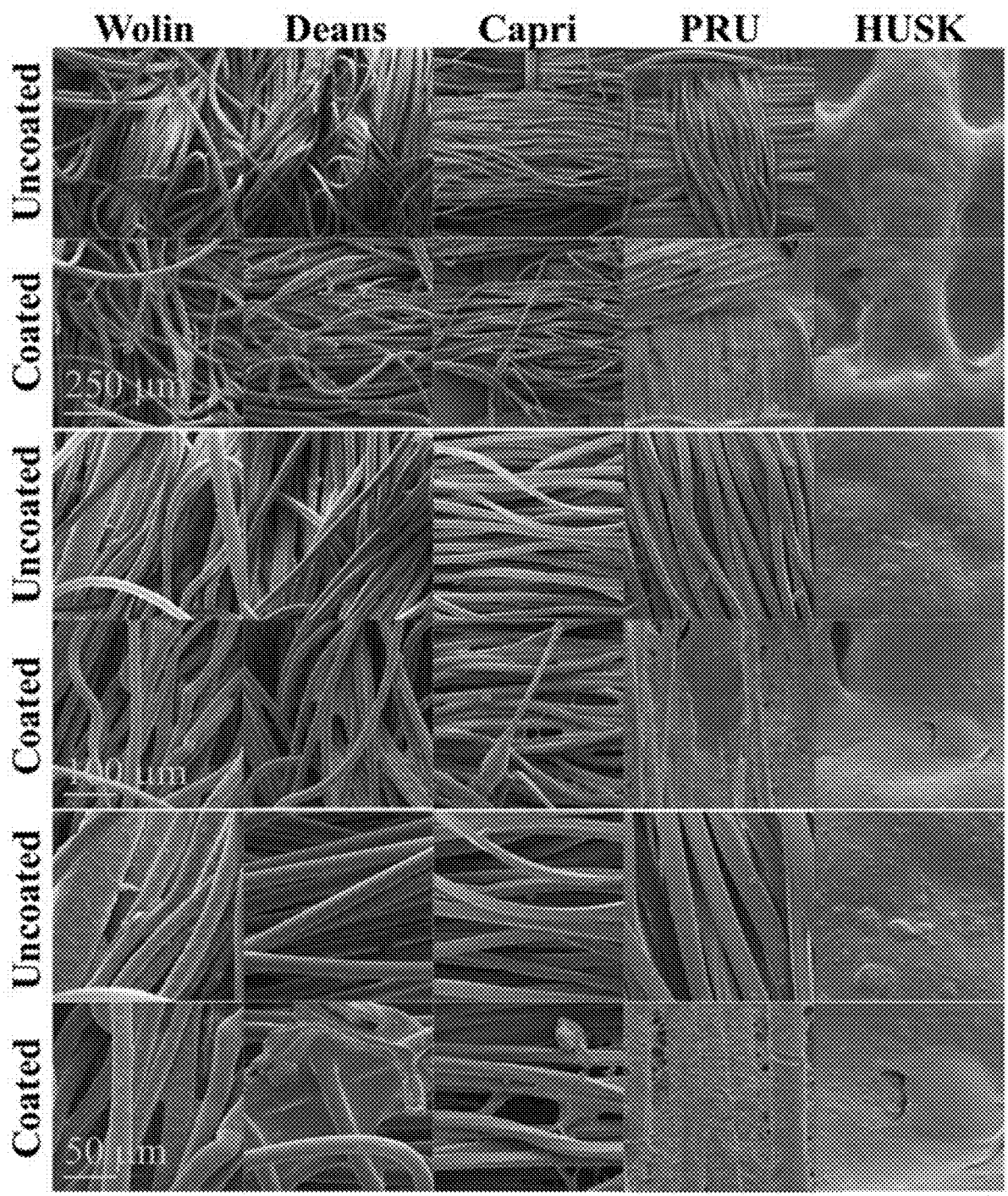
FIG. 9 shows additional SEM images of uncoated and coated (SbQ-PVA/ZnTMPyP$^{4+}$) VESCOM® materials (available from Vescom America Inc., Fairlawn, OH) at intermediate magnifications not already pictured in FIG. 4.

Scanning electron microscopy images acquired at various magnifications (in FIGS. 4 and 9) confirm the presence of the SbQ-PVA layer on each of the materials. In particular, the contrast of the SEM images collected at low magnification provide insight into the successful application of the coating: the sputtered SbQ-PVA/PS-uncoated samples show significant contrast between light and dark regions, indicative of variation in the surface topology of the material, whereas the sputtered SbQ-PVA/PS-coated samples generally exhibit less surface contrast, indicative of a smoother surface topology. The PRU and Husk materials appear to have a more even coating of SbQ-PVA, likely attributable to the pristine fibers being more closely packed/dense. Bridges and webs from the SbQ-PVA coating were also observed in images obtained from the Wolin, Deans and Capri materials. The NIH ImageJ software package was used to analyze SEM images of the various samples to ascertain the relative thickness of the coated layer on each material. Estimates were determined by measuring the diameters of both uncoated and coated fibers and calculating the difference, which was attributed to the polymer coating. While the resultant coating thicknesses varied 2-fold across the different materials: PRU (~1.8 µm)>Wolin (~1.4 µm)>Deans (~0.91 µm)>Capri (~0.76 µm), the thickness of the coating applied to the Husk specimen could not be determined due to the lack of identifiable individual fibers at the highest magnification employed. Compared to our earlier study employing SbQ-PVA/ZnTMPyP$^{4+}$ that yielded a coating thickness of ~150-200 nm, here we see a 5-10-fold increase in coating thickness. We attribute the increase here to two factors: (i) a larger quantity of initial SbQ-PVA/ZnTMPyP$^{4+}$ solution was used to saturate the thicker VESCOM® materials (available from Vescom America Inc., Fairlawn, OH) compared with the spunbond nylon mats previously employed, resulting in a thicker photoactive base layer; and (ii) the use of two "sealant" coats (achieved by sequential spray and dip coating) on top of the base layer as opposed to a single "sealant" coat (dip only) performed in our previous study. Additional ToF-SIMS imaging was used to further demonstrate the presence of the SbQ-PVA coating (FIG. 5). Comparison of pre- and post-coated materials shows a dramatic increase in $C_2H_3O_2^-$ ions, confirming the uniform presence of SbQ-PVA on each sample. While previous studies have utilized electron dispersive x-ray spectroscopy (EDS) and ToF-SIMS to confirm the presence of the ZnTMPyP$^{4+}$ photosensitizer, we were unable to do so here for two reasons: (i) the concentration of $Zn^+$ ions, coupled with overlapping peaks at similar m/z ratios, was too low to be discerned; and (ii) observation of the ZnTMPyP$^{4+}$ Cl$^-$ counterion was inconclusive to confirm the presence of the PS as each material exhibited a high loading of Cl$^-$ prior to coating (data not shown).

Porphyrin Loading

In addition, ICP-OES was used to determine the concentration of Zn in the coated materials, which directly correlates with the amount of ZnTMPyP$^{4+}$ photosensitizer, and thus the overall PS loading for each sample. Pristine samples were also examined to account for any background trace Zn intrinsically present within the uncoated materials. The concentration of the ZnTMPyP$^{4+}$ PS varied ~9-fold across all materials as follows: Husk (0.78 nmol/mg)>Wolin (0.62 nmol/mg)>PRU (0.20 nmol/mg)>Deans (0.13 nmol/mg)>Capri (0.09 nmol/mg).

Example 4: Antimicrobial Behavior

Employing ZnTMPyP$^{4+}$/SbQ-PVA

Unless otherwise noted, all in vitro aPDI assays were performed under fixed illumination conditions (60 min, 400-700 nm, 65±5 mW/cm$^2$). As displayed in FIG. 6A, neither the SbQ-PVA-only coated materials (PS-free) nor the non-illuminated SbQ-PVA/ZnTMPyP$^{4+}$ coated samples (dark controls) exhibited any statistically significant antibacterial activity against methicillin-susceptible *Staphylococcus aureus* ATCC-29213, thereby confirming the requirement for both light and addition of photosensitizer for photodynamic inactivation of this pathogen (in an oxygen-containing environment). Upon illumination, however, a significant photodynamic effect was observed for all SbQ-PVA/ZnTMPyP$^{4+}$ coated samples, ranging from 97% to 99.999% CFU/mL reduction, as follows: Husk (99.999%, 5 log units, P<0.001)>PRU (99.98%, ~3.9 log units, P=0.002)>Capri (99.75%, ~2.9 log units, P<0.001)>Deans (98.3%, ~1.9 log units, P=0.009)≈Wolin (97.3%, ~1.8 log units, P=0.002). These results confirm our expectations that the SbQ-PVA/ZnTMPyP$^{4+}$ spray coating can mediate the antibacterial photodynamic inactivation of MSSA upon illumination regardless of the base material used.

Figures 6A, 6B:
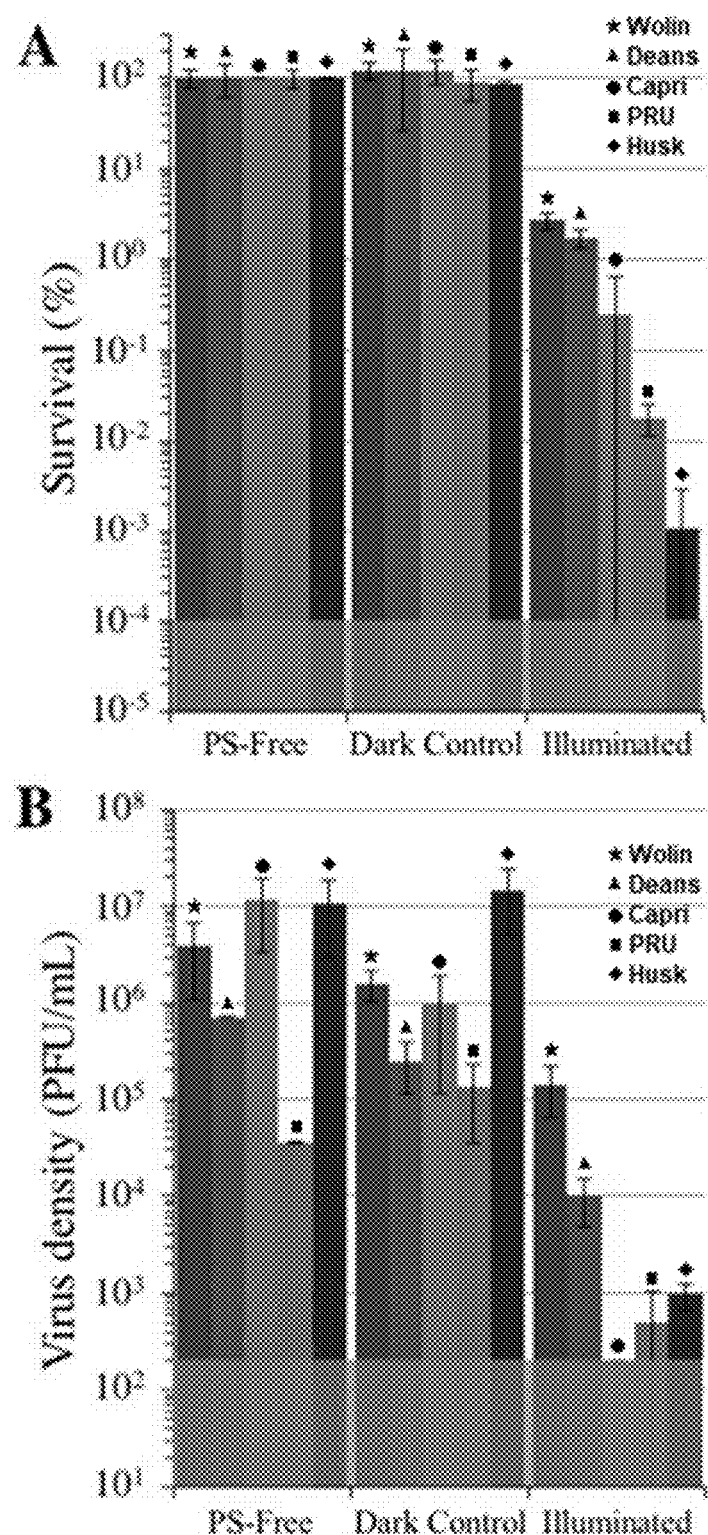
FIGS. 6A-6B show antimicrobial photodynamic inactivation efficacy of VESCOM® materials (available from Vescom America Inc., Fairlawn, OH) coated with SbQ-PVA/ZnTMPyP$^{4+}$ for (FIG. 6A) methicillin-susceptible S. aureus ATCC-29213 (MSSA) and (FIG. 6B) human coronavirus 229E (HCoV-229E). Assays were performed under fixed illumination conditions (60 min, 400-700 nm, 65±5 mW/cm$^2$). The grey shaded regions represent the minimum detection limit for each study. Error bars correspond to the standard deviation (n=3).

Antiviral photodynamic inactivation studies employing SbQ-PVA/ZnTMPyP$^{4+}$-coated samples against HCov-229E are included in FIG. 6B. Due to its infectivity and facile transmission, the SARS-CoV-2 virus requires at least biosafety level 3 (BSL-3) containment, which was not available for this study. For this reason, we chose to examine the HCoV-229E virus as a less pathogenic surrogate that has been documented to possess similar environmental stability as the more pathogenic coronaviruses (SARS-CoV, MERS-CoV, and SARS-CoV-2). Similar to the antibacterial studies described above, neither the SbQ-PVA-coated materials (PS-free) nor the non-illuminated SbQ-PVA/ZnTMPyP$^{4+}$-coated samples (dark controls) exhibited any statistically significant antiviral inactivation. In marked contrast, a substantial reduction in virus infectivity after exposure to light was observed for all spray-coated samples (% inactivation values are relative to the dark controls): Husk (99.993%, ~4.1 log units, P=0.038)>Capri (99.98%, ~3.9 log units, P<0.001)>PRU (99.6%, ~2.7 log units, P<0.001)>Deans (96.1%, ~1.5 log units, P<0.001)≈Wolin (91.1%, ~1.1 log units, P=0.041). With the exception of the Capri and Deans specimens that switched their order, the level of antiviral activity of the coated samples mirrors that observed above for the antibacterial study.

Employing Other PS/SbQ-PVA Coatings

Figures 7A, 7B:
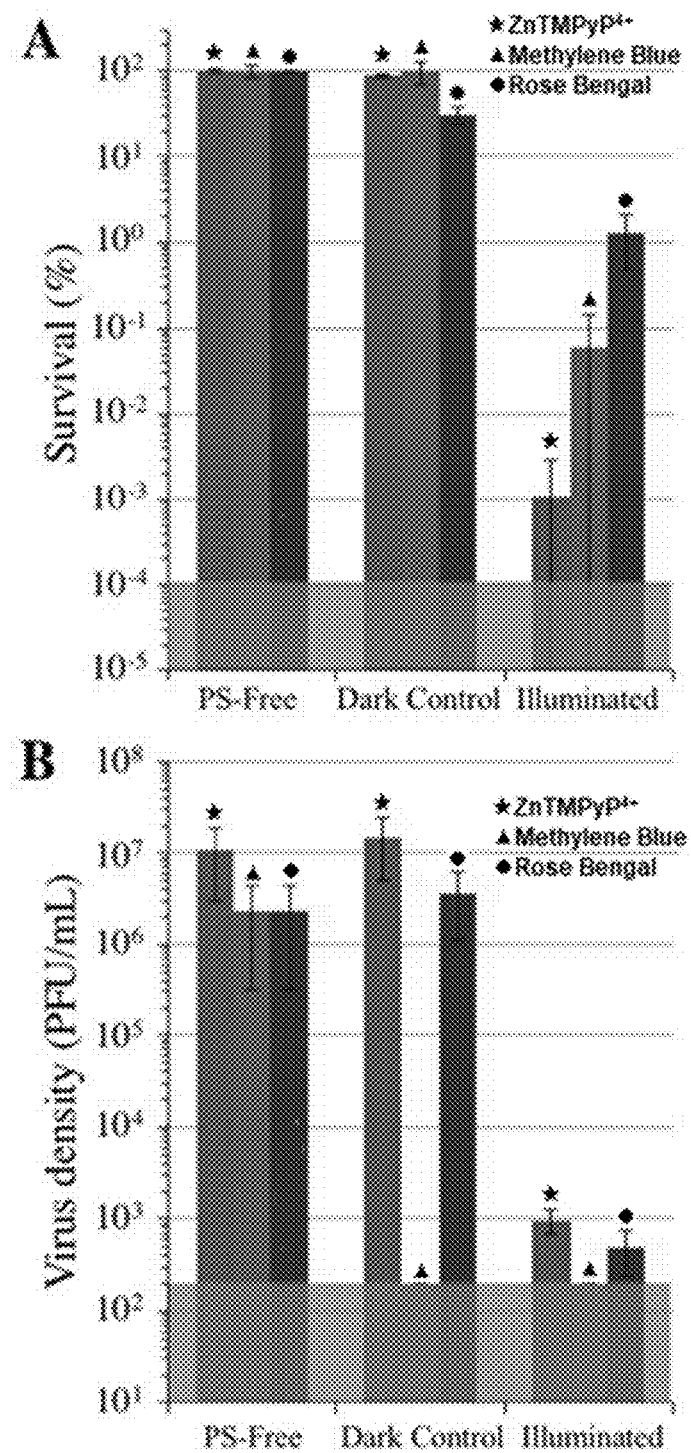
FIGS. 7A-7B show antimicrobial photodynamic inactivation efficacy of VESCOM® materials (available from Vescom America Inc., Fairlawn, OH) coated with SbQ-PVA/MB and SbQ-PVA/RB for (FIG. 7A) methicillin-susceptible S. aureus ATCC-29213 (MSSA) and (FIG. 7B) human coronavirus 229E (HCoV-229E). Experimental conditions were the same as those listed in FIGS. 6A-6B. The results for SbQ-PVA/ZnTMPyP$^{4+}$ are included for ease of comparison.

To examine the versatility of SbQ-PVA for accommodating a wide range of photosensitizers, we formulated two additional spray coatings for the Husk material, SbQ-PVA/methylene blue (MB) and SbQ-PVA/Rose Bengal (RB), at the identical 1% w/w PS/SbQ-PVA concentration employed for SbQ-PVA/ZnTMPyP$^{4+}$ and evaluated their aPDI efficacies against methicillin-susceptible *S. aureus* (MSSA) and HCoV-229E (FIGS. 7A-7B). The Husk specimen was selected as the base material as it was highly effective against both pathogens in the studies above. Against MSSA, an inactivation of 99.94% (3.4 log units, P<0.001) was gratifyingly observed for SbQ-PVA/MB, but a lower efficacy of 98.75% (1.9 log units, P<0.001) was ascertained for SbQ-PVA/RB (FIG. 7A). This was not unexpected, however, as the anionic RB photosensitizer is likely to have a comparatively poorer aPDI efficacy due to electrostatic repulsion with the negatively-charged cell wall of the bacterium when compared to the cationic methylene blue PS. The comparatively lower efficacy of the MB and RB coatings versus that employing ZnTMPyP$^{4+}$ is consistent with previous solution studies employing these photosensitizers.

In contrast to the differential antibacterial results between these three photosensitizer coatings, both SbQ-PVA/MB (99.992%, ~4.1 log units, P<0.001) and SbQ-PVA/RB (99.979%, ~3.8 log units, P<0.001) were able to mediate the photodynamic inactivation of HCoV-229E (FIG. 7B) as effectively as SbQ-PVA/ZnTMPyP$^{4+}$.

Photobleaching and Repeatability Studies

Figure 8:
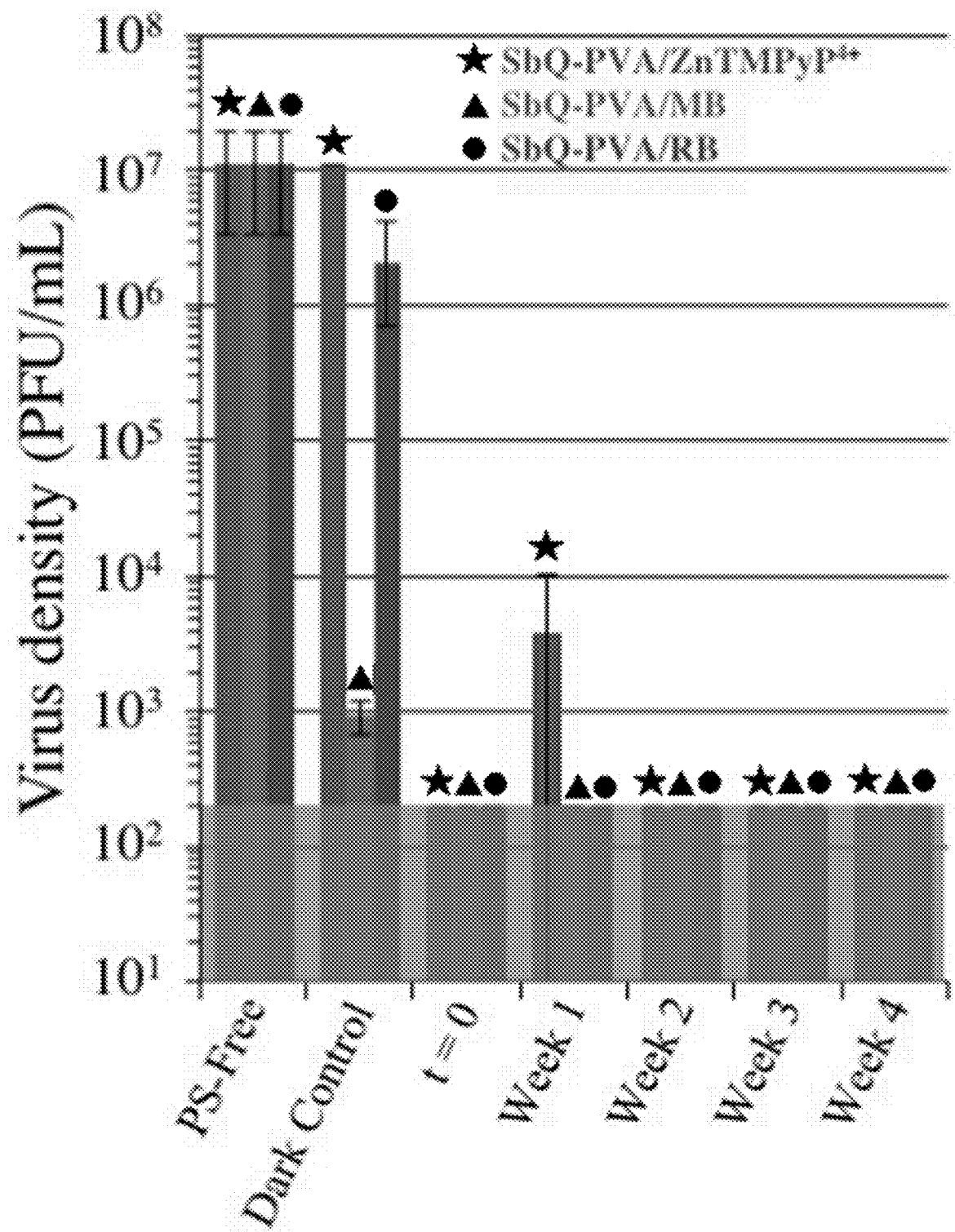
FIG. 8 shows antiviral photodynamic inactivation studies of VESCOM® materials (available from Vescom America Inc., Fairlawn, OH) coated with SbQ-PVA/ZnTMPyP$^{4+}$ (green), SbQ-PVA/MB (blue) and SbQ-PVA/RB (red) against human coronavirus 229E (HCoV-229E). Samples were exposed to ambient room light conditions as indicated in the figure, followed by evaluation for antiviral efficacy. Results shown are for samples that had been repeatedly subjected to the aPDI assay a total of three times. Illumination conditions were the same as those listed in FIGS. 6A-6B.

To examine the longevity of the SbQ-PVA/PS coatings with respect to photobleaching, aging experiments were performed where the coatings described above were exposed to ambient laboratory room light for 1-4 weeks, and then examined for antiviral photodynamic inactivation against HCoV-229E using our established aPDI protocol. All three spray coatings (SbQ-PVA/ZnTMPyP$^{4+}$, SbQ-PVA/MB and SbQ-PVA/RB), were found to inactivate HCoV-229E to the MDL regardless of their photobleaching age (data not shown). To assess repeatability, the same photobleached samples were first washed to remove traces of the initial assay, and the aPDI study against HCoV-229E was repeated a second time. Once more, all three coatings consistently exhibited inactivation to the MDL of 99.998% for these studies (data not shown). Repetition of the washing procedure followed by a third aPDI study against HCoV-229E once more yielded inactivation to the MDL (FIG. 8). The results shown here confirm the longevity of the SbQ-PVA/PS coatings with respect to ambient room light photobleaching, and suggest that such coatings would remain effective over multiple pathogen exposures.

Example 5: Discussion

Both the COVID-19 pandemic and the chronic problem of HAIs together illustrate that the transmission of viruses and drug-resistant bacteria from contaminated surfaces to new hosts constitutes a major threat to global healthcare, especially for elderly, injured and immune-compromised patients. Accordingly, effective preventative measures that include both surface disinfection methods and the increased production of PPE must be identified and put into place. To this latter point, however, the pandemic has repeatedly highlighted critical gaps in existing healthcare and manufacturing infrastructures, especially with regard to PPE availability. With supply chains impacted by a combination of worker illness, as well as shortfalls in common raw material sources (e.g., polypropylene) due to dramatically heightened demand, medical personnel and the general population are facing critical shortages of PPE, including N95 face masks, during the COVID-19 pandemic so much so that they have resorted to reusing disposable PPE despite the apparently underestimated threat posed by the survival of the virus on surgical masks. Thus, there is a critical need for re-usable and self-disinfecting PPE (SD-PPE) that are capable of affording patients and medical personnel with broad protection (against bacteria, viruses and fungi) for prolonged periods of time, and which are cost effective and facile to manufacture. Accordingly, the results obtained both previously and now here with SbQ-PVA/PS demonstrate the potential for photodynamic coatings to be more universally deployed for infection control. Spray-coating procedures (e.g., UV inks) can be easily integrated into PPE manufacturing lines; polymers such as SbQ-PVA are relatively eco-friendly (using water as the main solvent); and photosensitizers such as methylene blue (Provayblue™) with extensive FDA safety information can be selected, thereby minimizing regulatory issues.

As photosensitizers are often the highest cost component in a photodynamic coating, the efficiency of PS use is a significant consideration: photosensitizers buried deep within a polymer beyond the diffusion limit of the ROS (e.g., <250 nm for $^1O_2$) will contribute to coating cost, but not to its antimicrobial efficacy. We have previously established that photodynamic materials employing cellulose-based scaffolds (cellulose nanocrystals, nanofibrillated cellulose and macrofibers/paper) generally contained PS loadings in the range of 10-400 nmol/mg material, traditionally-dyed fabrics were in the range of 10-80 nmol PS/mg material, and electrospun nonwoven materials employing polyacrylonitrile and nylon scaffolds were loaded in the range of 3.4-35 nmol PS/mg material. The majority of these modified materials had the photosensitizer incorporated during fabrication, with the PS distributed throughout the material. Here, the overall PS loading via spray coating was found to be 0.09-0.78 nmol/mg material, significantly lower, by as much as 10000× than observed in the aforementioned studies. We therefore surmise that spray coating as a surface-only application is an efficient method for producing photodynamic materials, akin to core-sheath fibers that utilize the outer sheath for conferring specific properties without the need to incorporate functional agents throughout the core.

Despite the lower photosensitizer loadings compared to previous materials, the results of the in vitro aPDI assays demonstrated that SbQ-PVA/PS coatings are effective at conferring antimicrobial activity to commercially available materials, with inactivation of *S. aureus* and HCoV-229E by ~2-5 log units depending on the base VESCOM® material (available from Vescom America Inc., Fairlawn, OH) employed. While some differences in efficacy between the materials can be explained in part by PS loading (e.g., the high inactivation of Husk against both pathogens correlates well to its high PS loading), this alone fails to explain why the Wolin (highest PS loading) material consistently shows the lowest antimicrobial activity, or why the Capri specimen has relatively good antiviral efficacy despite possessing the lowest amount of PS. Such differences in efficacy likely stem from the different surface characteristics of the VESCOM® materials (available from Vescom America Inc., Fairlawn, OH), such as hydrophobicity, porosity and thickness. Thicker and more fibrous materials (Wolin and Deans) were poorer at mediating both antibacterial and antiviral photodynamic inactivation, most likely due to the inability of the SbQ-PVA/PS coating to penetrate into the interior of the fiber mats where pathogens could reside beyond the diffusion distance of $^1O_2$ produced by the surface coating. Conversely, SEM images showed that the coated Husk and PRU materials possess lower porosity, and likely minimize the penetration of the pathogens into the PS-free interior of the fiber mats. While these are the most likely factors, additional studies that more systematically control fiber/material properties are needed to obtain a better understanding of how such material characteristics affect the antimicrobial character of the SbQ-PVA/PS coatings.

While all three spray coatings (SbQ-PVA/ZnTMPyP$^{4+}$, SbQ-PVA/MB and SbQ-PVA/RB) exhibited comparable antiviral activity against HCoV-229E, more significant differences in their antibacterial activity were noted. We interpret these differences in light of the electrostatic properties of the photosensitizers relative to those of bacterial pathogens. Specifically, the cationic photosensitizers ZnTMPyP$^{4+}$ and MB are expected to promote antimicrobial photodynamic inactivation via their electrostatic attraction to the negatively charged bacterial cell membrane wall, helping to facilitate pathogen:coating interactions that overcome the limited diffusion distance of $^1O_2$ from a photodynamic surface. Conversely, the anionic RB photosensitizer would disfavor such an interaction owing to electrostatic repulsion. No such electrostatic-dependent mechanism between the PS and the pathogen has been identified for antiviral photodynamic inactivation, consistent with our results, but we recognize that the mechanisms of aPDI against viruses are comparatively less understood than for bacteria. In light of our promising results with HCoV-229E, we also investigated the long-term viability of the SbQ-PVA/PS coatings with respect to photobleaching against this pathogen. Even after 4 weeks of ambient room light exposure, all three SbQ-PVA/PS coatings were able to mediate detection-limit inactivation of HCoV-229E. Those materials also remained active through a wash and assay repeat cycle. While our previous studies have shown that photobleaching is decreased when a PS is embedded within a polymer matrix, it should be noted, however, that these studies were never performed for such an extended period of time, thus further emphasizing the efficacy of SbQ-PVA/PS coatings.

In conclusion, the results here further confirm that photodynamic spray coatings afford a largely unexplored route to accelerated, effective and comprehensive antimicrobial materials, particularly for their application in reusable self-disinfecting PPE. To-date, and despite their highly potent antimicrobial activity, the adoption of such photoactive materials to reduce infection transmission in hospitals and related healthcare facilities has been hampered by the lack of a scalable and cost-effective means to manufacture them, and high-production methods for producing aPDI-based materials are needed. Here, we have demonstrated that a simple bicomponent spray coating comprised of a photocrosslinkable polymer and a photosensitizer can be applied to a range of commercially available materials used in the public sector. Not only is the spray coating method facile, inexpensive and scalable through the use of off-the-shelf components, it is well suited for expedient integration into existing manufacturing lines that already employ similar UV-curable inks. While further studies examining the launderability and durability of such coatings are needed (as are studies on a wider scope of materials (e.g., polypropylene) more commonly used in PPE), these and other studies suggest that photodynamic spray coatings may be a simple but effective tool for reducing the transmission of pathogens in healthcare settings, thereby adding to the infection-prevention toolbox available to healthcare workers and the general public.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

REFERENCES

1. Adlhart, C., et al. (2018). Surface modifications for antimicrobial effects in the healthcare setting: a critical overview. J. Hosp. Infect. 99, 239-249.
2. Alvarado, D. R., et al. (2019). A Facile Strategy for Photoactive Nanocellulose-based Antimicrobial Materials. Green Chem. 21, 3424-3435.
3. Carpenter, B. L., et al. (2012). Porphyrin-Cellulose Nanocrystals: A Photobactericidal Material that Exhibits Broad Spectrum Antimicrobial Activity. Photochem. Photobiol. 88, 527-536.
4. Carpenter, B. L., et al. (2015). Antiviral, Antifungal and Antibacterial Activities of a BODIPY-Based Photosensitizer. Molecules 20, 10604-10621.
5. Carpenter, B. L., et al. (2015). Synthesis, Characterization, and Antimicrobial Efficacy of Photomicrobicidal Cellulose Paper. Biomacromolecules 16, 2482-2492.
6. Chen, W., et al. (2018). Photooxidation Properties of Photosensitizer/Direct Dye Patterned Polyester/Cotton Fabrics. Fiber Polym. 19, 1687-1693.
7. Chen, W., et al. (2019). Wool/Acrylic Blended Fabrics as Next-Generation Photodynamic Antimicrobial Materials. ACS Appl. Mater. Interfaces 11, 29557-29568.
8. Chin, A. W. H., et al, (2020). Stability of SARS-CoV-2 in different environmental conditions. The Lancet Microbe 1, e10.
9. Cieplik, F., et al. (2018). Antimicrobial photodynamic therapy—what we know and what we don't. Crit. Rev. Microbiol. 44, 571-589.
10. Cioffi, N., et al. (2005). Copper Nanoparticle/Polymer Composites with Antifungal and Bacteriostatic Properties. Chem. Mater. 17, 5255-5262.
11. Corman, V. M., et al. (2015). Evidence for an Ancestral Association of Human Coronavirus 229E with Bats. J. Virol. 89, 11858-11870.
12. Dahl, T. A., et al. (1987). Pure Singlet Oxygen Cytotoxicity for Bacteria. Photochem. Photobiol. 46, 345-352.
13. Demir, B., et al. (2015). N-Halamine-Modified Antimicrobial Polypropylene Nonwoven Fabrics for Use against Airborne Bacteria. ACS Appl. Mater. Interfaces 7, 1752-1757.
14. Dong, J., et al. (2018). Protoporphyrin IX Conjugated Bacterial Cellulose via Diamide Spacer Arms with Specific Antibacterial Photodynamic Inactivation Against *Escherichia coli*. Cellulose 25, 1673-1686.
15. Dong, J., et al. (2018). Protoporphyrin-IX Conjugated Cellulose Nanofibers that Exhibit High Antibacterial Photodynamic Inactivation Efficacy. Nanotechnology 29, e265601.
16. Eckl, D. B., et al. (2018). A Closer Look at Dark Toxicity of the Photosensitizer TMPyP in Bacteria. Photochem. Photobiol. 94, 165-172.
17. Feese, E., et al. (2009). Highly Efficient In Vitro Photodynamic Inactivation of *Mycobacterium smegmatis*. J. Antimicrob. Chemother. 64, 782-785.
18. Feese, E., et al. (2011). Photobactericidal Porphyrin-Cellulose Nanocrystals: Synthesis, Characterization, and Antimicrobial Properties. Biomacromolecules 12, 3528-3539.
19. Feese, E., et al. (2019). Towards microbe-targeted photosensitizers: Synthesis, characterization and in vitro photodynamic inactivation of the tuberculosis model pathogen *M. smegmatis* by porphyrin-peptide conjugates. J. Porphyr. Phthalocyanines 23, 1414-1439.
20. Fijan, S., et al. (2012). Hospital Textiles, Are They a Possible Vehicle for Healthcare-Associated Infections? Int. J. Env. Res. Public Health 9, 3330-3343.
21. Hamblin, M. R. (2016). Antimicrobial Photodynamic Inactivation: A Bright New Technique to Kill Resistant Microbes. Curr. Opin. Microbiol. 33, 67-73.

22. Huang, L., et al. (2012). Type I and Type II Mechanisms of Antimicrobial Photodynamic Therapy: An In Vitro Study on Gram-negative and Gram-positive Bacteria. Lasers Surg. Med. 44, 490-499.
23. Huang, L., et al. (2018). Progressive cationic functionalization of chlorin derivatives for antimicrobial photodynamic inactivation and related vancomycin conjugates. Photochem. Photobiol. Sci. 17, 638-651.
24. Hurst, A. N. S.; et al. (2019). Influence of Cationic meso-Substituted Porphyrins on the Antimicrobial Photodynamic Efficacy and Cell Membrane Interaction in *Escherichia coli*. Int. J. Mol. Sci. 20, 134.
25. lyigundogdu, Z. U., et al. (2017). Developing Novel Antimicrobial and Antiviral Textile Products. Appl. Biochem. Biotechnol. 181, 1155-1166.
26. Jain, A., et al. (2014). Antimicrobial Polymers. Adv. Healthc. Mater. 3, 1969-1985.
27. Jiang, C., et al. (2019). Mn-doped Zn/S quantum dots as photosensitizers for antimicrobial photodynamic inactivation. SPIE.
28. Jiao, Y., et al. (2017). Quaternary ammonium-based biomedical materials: State-of-the-art, toxicological aspects and antimicrobial resistance. Prog. Polym. Sci. 71, 53-90.
29. Johns Hopkins Coronavirus Resource Center <https://coronavirus.jhu.edu/map.html>, accessed Jan. 20, 2021.
30. Kramer, A., et al. (2006). How long do nosocomial pathogens persist on inanimate surfaces? A systematic review. BMC Infect. Dis. 6, 130.
31. Lamarre, A., et al. (1989). Effect of pH and temperature on the infectivity of human coronavirus 229E. Can. J. Microbiol. 35, 972-974.
32. Le Guern, F. (2017). Enhanced Photobactericidal and Targeting Properties of a Cationic Porphyrin following the Attachment of Polymyxin B. Bioconjugate Chemistry 28, 2493-2506.
33. Maldonado-Carmona, N., et al. (2020). Conjugating biomaterials with photosensitizers: advances and perspectives for photodynamic antimicrobial chemotherapy. Photochem. Photobiol. Sci. 19, 445-461.
34. Mbakidi, J. P., et al. (2013). Synthesis and photobiocidal properties of cationic porphyrin-grafted paper. Carbohydr. Polym. 91, 333-338.
35. Merkel, P. B., et al. (1972). Radiationless Decay of Singlet Molecular Oxygen in Solution. Experimental and Theoretical Study of Electronic-to-Vibrational Energy Transfer. Journal of the American Chemical Society 94, 7244-7253.
36. Mesquita, M. Q., Dias, C. J., Neves, M. G. P. M. S., Almeida, A., and Faustino, M. a. F. (2018). Revisiting Current Photoactive Materials for Antimicrobial Photodynamic Therapy. Molecules 23, 2424.
37. Midden, W. R., et al. (1983). Singlet Oxygen Generation for Solution Kinetics: Clean and Simple. Journal of the American Chemical Society 105, 4129-4135.
38. Morais, D. S., et al. (2016). Antimicrobial Approaches for Textiles: From Research to Market. Materials (Basel) 9, e498.
39. Mosinger, J., et al. (2006). Light-induced aggregation of cationic porphyrins. J. Photochem. Photobiol. A: Chem. 181, 283-289.
40. Muli, D. K., et al. (2015). Dendritic near-IR absorbing zinc phthalocyanines for antimicrobial photodynamic therapy. Tetrahedron Lett. 56, 3541-3545.
41. Munoz-Price, L. S., et al. (2012). Associations Between Bacterial Contamination of Health Care Workers' Hands and Contamination of White Coats and Scrubs. Am. J. Infect. Control 40, e245-e248.
42. Naeimirad, M., et al. (2018). Recent advances in core/shell bicomponent fibers and nanofibers: A review. J. Appl. Polym. Sci. 135, 46265.
43. Neely, A. N., et al. (2000). Survival of Enterococci and Staphylococci on Hospital Fabrics and Plastic. J. Clin. Microbiol. 38, 724-726.
44. Otter, J. A., et al. (2013). Evidence that contaminated surfaces contribute to the transmission of hospital pathogens and an overview of strategies to address contaminated surfaces in hospital settings. Am. J. Infect. Control 41, S6-S11.
45. Peddinti, B. S. T., et al. (2018). Photodynamic Polymers as Comprehensive Anti-Infective Materials: Staying Ahead of a Growing Global Threat. ACS Appl. Mater. Interfaces 10, 25955-25959.
46. Peddinti, B. S. T., et al. (2021). Photodynamic Coatings on Polymer Microfibers for Pathogen Inactivation: Effects of Application Method and Composition. ACS Appl. Mater. Interfaces 13, 155-163.
47. Peddinti, B. S. T., et al J. (2019). Inherently self-sterilizing charged multiblock polymers that kill drug-resistant microbes in minutes. Materials Horizons 6, 2056-2062.
48. Qiao, Y., et al. (2012). Highly dynamic biodegradable micelles capable of lysing Gram-positive and Gram-negative bacterial membrane. Biomaterials 33, 1146-1153.
49. Richter, A. P., et al. (2015). An environmentally benign antimicrobial nanoparticle based on a silver-infused lignin core. Nature Nanotechnology 10, 817-823.
50. Ringot, C., et al (2011). Triazinyl Porphyrin-Based Photoactive Cotton Fabrics: Preparation, Characterization, and Antibacterial Activity. Biomacromolecules 12, 1716-1723.
51. Salwiczek, M., et al, (2014). Emerging rules for effective antimicrobial coatings. Trends Biotechnol. 32, 82-90.
52. Song, A., et al. (2011). Antibacterial Studies of Cationic Polymers with Alternating, Random, and Uniform Backbones. ACS Chemical Biology 6, 590-599.
53. Sperandio, F. F., et al. (2013). Antimicrobial Photodynamic Therapy to Kill Gram-negative Bacteria. Recent Pat. Antiinfect. Drug Discov. 8, 108-120.
54. Stanley, S., et al. (2016). Photosensitizer-Embedded Polyacrylonitrile Nanofibers as Antimicrobial Non-Woven Textile. Nanomaterials 6, e77.
55. Stoll, K. R., et al. (2019). BODIPY-embedded electrospun materials in antimicrobial photodynamic inactivation. Photochem. Photobiol. Sci. 18, 1923-1932.
56. Uneke, C. J., et al. (2010). The Potential for Nosocomial Infection Transmission by White Coats Used by Physicians in Nigeria: Implications for Improved Patient-Safety Initiatives. World Health & Population 11, 44-54.
57. Van Doremalen, N., et al (2020). Aerosol and Surface Stability of SARS-CoV-2 as Compared with SARS-CoV-1. New Engl. J. Med., DOI: 10.1056/NEJMc2004973.
58. Wainwright, M., et al. (2015). Phenothiazinium photoantimicrobials with basic side chains. J. Photochem. Photobiol. B 150, 28-43.
59. Wainwright, M., et al. (2017). Photoantimicrobials-are we afraid of the light? Lancet Infect. Dis. 17, e49-e55.

60. Wang, Q., et al. (2018). Preparation of Photodynamic P (MMA-co-MAA) Composite Nanofibers Doped with MMT: A Facile Method for Increasing Antimicrobial Efficiency. Appl. Surf. Sci. 457, 247-255.
61. Wang, T., et al. (2020). Photoinactivation of bacteria by hypocrellin-grafted bacterial cellulose. Cellulose 27, 991-1007.
62. Weber, D. J., et al. (2010). Role of hospital surfaces in the transmission of emerging health care-associated pathogens: norovirus, *Clostridium difficile*, and *Acinetobacter* species. Am. J. Infect. Control 38, S25-33.
63. Zhu, D., et al. (2016). Enhanced water-solubility and antibacterial activity of novel chitosan derivatives modified with quaternary phosphonium salt. Materials Science and Engineering: C 61, 79-84.

What is claimed is:

1. A method for imparting antimicrobial properties to a surface, the method comprising:
   (a) applying a composition consisting of a photosensitizer, a first crosslinkable polymer, and a solvent to one or more sides of the surface;
   (b) crosslinking the first crosslinkable polymer;
   wherein the surface is a wall covering, a curtain, upholstery, hospital linens, personal protective equipment, entertainment displays, windows, handles, railings, or any combination thereof; and
   (c) applying a sealant composition to one or more sides of the surface;
   wherein the sealant composition consists of a second crosslinkable polymer and the solvent;
   wherein step (c) is optionally performed a second time;
   wherein the first crosslinkable polymer comprises poly(vinyl alcohol) N-methyl-4(4'-formylstyryl)pyridinium methosulfate acetal (PVA-SbQ), bisphenol A glycerolate dimethacrylate (Bis-GMA), bisphenol A ethoxylate dimethacrylate (Bis-EMA), urethane-dimethacrylate monomer (UDMA), triethylene glycol dimethacrylate (TEGDMA), or any combination thereof; and
   wherein the second crosslinkable polymer and the first crosslinkable polymer are different.

2. The method of claim 1, wherein the photosensitizer comprises zinc tetra(4-N-methylpyridyl)porphine (ZnTMPyP$^{4+}$), Rose Bengal, methylene blue, tetraphenylporphyrin, curcumin, chlorophyllin A, protoporphyrin IX, carbon quantum dots, or any combination thereof.

3. The method of claim 1, wherein the PVA-SbQ comprises from about 0.1 mol % to about 20 mol % pendant SbQ groups.

4. The method of claim 1, wherein the solvent comprises water.

5. The method of claim 1, wherein crosslinking the first crosslinkable polymer is accomplished by exposing the surface to ultraviolet (UV) radiation.

6. The method of claim 1, further comprising crosslinking the second crosslinkable polymer.

7. The method of claim 6, wherein crosslinking the second crosslinkable polymer from the sealant composition is accomplished by exposing the surface to UV radiation.

8. The method of claim 1, wherein the second crosslinkable polymer is selected from poly(vinyl alcohol), N-methyl-4(4'-formylstyryl)pyridinium methosulfate acetal (PVA-SbQ), bisphenol A glycerolate dimethacrylate (Bis-GMA), bisphenol A ethoxylate dimethacrylate (Bis EMA), urethane-dimethacrylate monomer (UDMA), triethylene glycol dimethacrylate (TEGDMA), or any combination thereof.

9. A method for activating antimicrobial properties of a surface, the method comprising:
   (a) performing the method of claim 1 on the surface; and
   (b) illuminating one or more sides of the surface;
   wherein illuminating the one or more sides of the surface activates the photosensitizer.

10. The method of claim 9, wherein the one or more sides of the surface are illuminated using fluorescent room lighting, light-emitting diode (LED) room lighting, incandescent lighting, laser light, halogen lighting, metal halide lighting, high pressure sodium lighting, low pressure sodium lighting, flash lamp lighting, sunlight, or any combination thereof.

11. The method of claim 9, wherein performing the method inactivates from about 90% to about 99.9999% of at least one pathogen on the surface.

12. The method of claim 11, wherein the at least one pathogen comprises *Staphylococcus aureus, Pseudomonas aeruginosa*, an *Enterococcus* species, *Klebsiella pneumoniae*, an *Enterobacter* species, *Acinetobacter baumannii, Bacillus subtilis, Clostridium difficile*, a human coronavirus, feline calicivirus, norovirus, human adenovirus type 5, influenza A, vesicular stomatitis virus, dengue virus, *Trichophyton interdigitale, Candida albicans, Candida glabrata, Cryptococcus neoformans*, or any combination thereof.

13. The method of claim 9, wherein the surface remains antimicrobial for a period of from 1 week to 6 months.

* * * * *